(12) United States Patent
Jiang et al.

(10) Patent No.: US 10,606,469 B2
(45) Date of Patent: Mar. 31, 2020

(54) DEVICE, METHOD, AND GRAPHICAL USER INTERFACE FOR MANAGING MULTIPLE DISPLAY WINDOWS

(71) Applicant: Cheetah Mobile Inc., Grand Cayman (KY)

(72) Inventors: Xiaoming Jiang, Beijing (CN); Jian Yan, Beijing (CN); Xiongfeng Yu, Beijing (CN); Ming Xu, Beijing (CN)

(73) Assignee: CHEETAH MOBILE INC., Grand Cayman (KY)

( * ) Notice: Subject to any disclaimer, the term of this patent is extended or adjusted under 35 U.S.C. 154(b) by 202 days.

(21) Appl. No.: 14/382,744

(22) PCT Filed: Apr. 4, 2014

(86) PCT No.: PCT/CN2014/074869
§ 371 (c)(1),
(2) Date: Oct. 8, 2015

(87) PCT Pub. No.: WO2015/149375
PCT Pub. Date: Oct. 8, 2015

(65) Prior Publication Data
US 2016/0253086 A1    Sep. 1, 2016

(51) Int. Cl.
*G06F 3/048*     (2013.01)
*G06F 3/0488*    (2013.01)
*G06F 3/0482*    (2013.01)
*G06F 3/0484*    (2013.01)

(52) U.S. Cl.
CPC .......... *G06F 3/04883* (2013.01); *G06F 3/048* (2013.01); *G06F 3/0482* (2013.01); *G06F 3/04845* (2013.01)

(58) Field of Classification Search
CPC .... G06F 3/04883; G06F 3/048; G06F 3/0482; G06F 3/04845
See application file for complete search history.

(56) References Cited

U.S. PATENT DOCUMENTS

| | | | | |
|---|---|---|---|---|
| 5,856,821 A * | 1/1999 | Funahashi | ............. | H04N 5/445 345/667 |
| 6,008,809 A * | 12/1999 | Brooks | ................ | G06F 3/0481 715/792 |
| 2003/0193524 A1* | 10/2003 | Bates | ................. | G06F 3/04855 715/786 |
| 2004/0032599 A1* | 2/2004 | Atkins | .............. | H04N 1/00132 358/1.9 |
| 2010/0023858 A1* | 1/2010 | Ryu | ...................... | G06F 3/0416 715/702 |
| 2010/0053216 A1* | 3/2010 | Iwase | .................... | G06F 3/0483 345/634 |

(Continued)

*Primary Examiner* — Kieu D Vu
*Assistant Examiner* — Asteway T Gattew
(74) *Attorney, Agent, or Firm* — Morgan, Lewis & Bockius LLP

(57) ABSTRACT

A method is performed at an electronic device with a touch screen. The method includes: selecting one or more windows to be rendered on the touch screen and a display order associated with the selected windows; determining a respective display location for each of the selected windows based at least in part on the display order and a total number of the selected windows; and rendering the selected windows on the touch screen according to their respective display locations in a card fan manner.

23 Claims, 18 Drawing Sheets

(56) References Cited

U.S. PATENT DOCUMENTS

| | | | |
|---|---|---|---|
| 2010/0281374 A1* | 11/2010 | Schulz | G06F 3/0482 |
| | | | 715/723 |
| 2013/0125050 A1* | 5/2013 | Goshey | G06F 3/048 |
| | | | 715/800 |
| 2013/0290116 A1* | 10/2013 | Hepworth | G06Q 30/02 |
| | | | 705/14.73 |
| 2014/0204040 A1* | 7/2014 | Kim | G06F 1/1694 |
| | | | 345/173 |

* cited by examiner

600

602 Select one or more windows to be rendered on the touch screen and a display order associated with the selected windows

604 Determine a respective display location for each of the selected windows based at least in part on the display order and a total number of the selected windows

606 Render the selected windows on the touch screen according to their respective display locations in a card fan manner

608 The selected windows correspond to instances of different applications running on the electronic device

610 The selected windows correspond to instances of one application running on the electronic device.

614 Detect a user instruction to add a new window to the selected windows

616 In response to the user instruction:

618 Update the total number of the selected windows

620 Update the respective display locations of the selected windows on the touch screen when the updated total number of the selected windows is within a predefined range

622 Dynamically render the new window and the selected windows on the touch screen according to their respective updated display locations in the card fan manner

FIG. 4A

DEVICE, METHOD, AND GRAPHICAL USER INTERFACE FOR MANAGING MULTIPLE DISPLAY WINDOWS

CROSS REFERENCE TO RELATED APPLICATION

This Application is a United States National Stage Application filed under 35 U.S.C. § 371 of PCT Patent Application Serial No. PCT/CN2014/074869 filed on Apr. 4, 2014, which is hereby incorporated by reference in its entirety.

FIELD

This application relates generally to electronic devices with touch-sensitive surfaces, including but not limited to electronic devices with touch-sensitive surfaces that manage multiple display windows on the touch-sensitive surfaces based on user instructions (e.g., through finger gestures).

BACKGROUND

The use of touch-sensitive surfaces as input devices for computers and other electronic devices has increased significantly in recent years. Exemplary touch-sensitive surfaces include touch pads and touch screens. Such surfaces are widely used to manipulate user interface objects on a display. Exemplary manipulations include opening/closing an object or adjusting the position and/or size of the object. Exemplary user interface objects include digital images, video, windows, and other graphics.

Existing methods for performing these manipulations are cumbersome, inflexible, inefficient, and less intuitive. For example, users of existing electronic devices often find a challenge to manipulate a large number of windows in a more user friendly manner. As a result, an ill-chosen method may create a significant cognitive burden on a user, thereby causing the user to take longer to complete a task with the device, wasting the user's time and the device's battery power.

SUMMARY

Accordingly, there is a need for electronic devices with faster, more efficient and intuitive methods and interfaces for manipulating user interface objects. Such methods and interfaces may complement or replace conventional methods for manipulating user interface objects. Such methods and interfaces reduce the cognitive burden on a user and produce a more efficient human-machine interface. For battery-operated electronic devices, such methods and interfaces conserve power and increase the usage time between battery charges.

The above deficiencies and other problems associated with user interfaces for electronic devices with touch-sensitive surfaces are reduced or eliminated by the disclosed devices, which may be a desktop computer or a portable device (e.g., a notebook computer, tablet computer, or handheld device) that has a touch-sensitive surface (e.g., a touchpad or touch screen). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In accordance with some embodiments, a method is performed at an electronic device having a touch screen, one or more processors and memory storing programs executed by the one or more processors. The method includes: selecting one or more windows to be rendered on the touch screen and a display order associated with the selected windows; determining a respective display location for each of the selected windows based at least in part on the display order and a total number of the selected windows; and rendering the selected windows on the touch screen according to their respective display locations in a card fan manner.

In accordance with some embodiments, an electronic device includes a touch screen, one or more processors, memory, and one or more programs; the one or more programs are stored in the memory and configured to be executed by the one or more processors and the one or more programs include instructions for performing the operations of the method described above. In accordance with some embodiments, a graphical user interface on an electronic device having a touch screen, a memory, and one or more processors to execute one or more programs stored in the memory includes one or more of the elements displayed in the method described above, which are rendered and updated in response to user inputs, as described in the method above. In accordance with some embodiments, a computer readable storage medium has stored therein instructions which, when executed by an electronic device having a touch screen, cause the device to perform the operations of the method described above. In accordance with some embodiments, an electronic device includes: a touch screen and means for performing the operations of the method described above. In accordance with some embodiments, an information processing apparatus, for use in an electronic device with a touch screen, includes means for performing the operations of the method described above.

Thus, electronic devices with touch screens are provided with faster, more efficient and intuitive methods and interfaces for manipulating user interface objects, thereby increasing the effectiveness, efficiency, and user satisfaction with such devices. Such methods and interfaces may complement or replace conventional methods for manipulating user interface objects.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 3A-3K are exemplary user interfaces illustrating manipulating user interface objects on a touch screen in accordance with some embodiments.

FIGS. 4A-4E are flow diagrams illustrating a method of manipulating user interface objects in accordance with some embodiments.

Like reference numerals refer to corresponding parts throughout the several views of the drawings.

DETAILED DESCRIPTION

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

Embodiments of electronic devices, user interfaces for such devices, and associated processes for using such devices are described. In some embodiments, the electronic device is a portable communications device, such as a mobile telephone, that also contains other functions, such as PDA and/or music player functions. Other portable devices, such as laptops or tablet computers with touch-sensitive surfaces (e.g., touch screens and/or touch pads), may also be used. It should also be understood that, in some embodiments, the device is not a portable communications device, but is a desktop computer with a touch-sensitive surface (e.g., a touch screen and/or a touch pad).

In the discussion that follows, an electronic device that includes a display and a touch-sensitive surface is described. It should be understood, however, that the electronic device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications executed on the device may use at least one common physical user-interface device, such as the touch-sensitive surface. One or more functions of the touch-sensitive surface as well as corresponding information displayed on the touch-sensitive surface may be adjusted and/or varied from one application to the next and/or within a respective application. In this way, a common physical architecture (such as the touch-sensitive surface) of the device may support the variety of applications with user interfaces that are intuitive and transparent to the user.

Figure 1A:
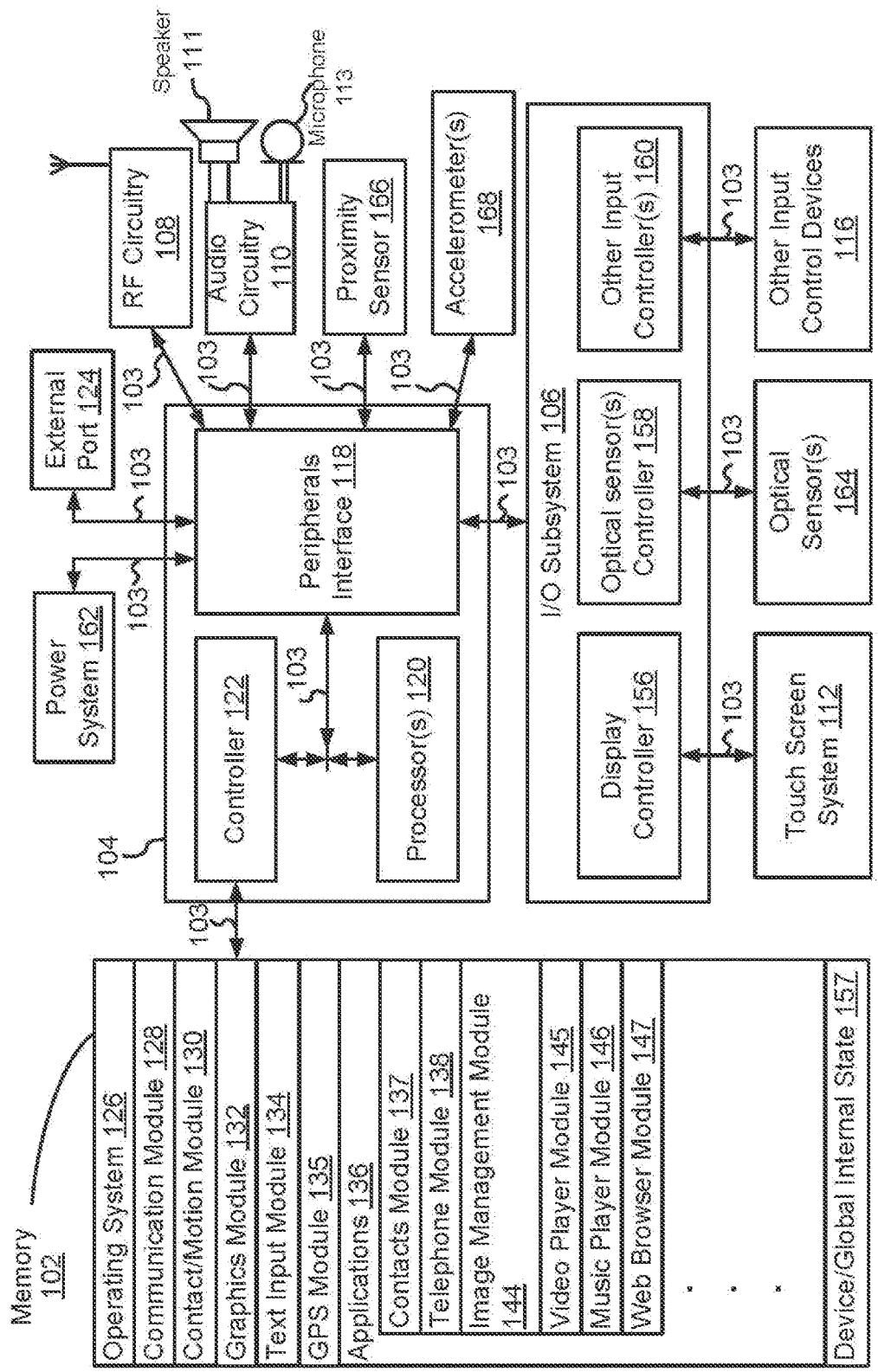
FIG. 1A is a block diagram illustrating a portable electronic device having a touch screen in accordance with some embodiments.

Attention is now directed toward embodiments of a portable electronic device having a touch screen. FIG. 1A is a block diagram illustrating a portable electronic device 100 having a touch screen system 112 in accordance with some embodiments. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable electronic device, and that device 100 may have more or fewer components than shown, may combine two or more components, or may have a different configuration or arrangement of the components. The various components shown in FIG. 1A may be implemented in hardware, software, or a combination of hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack. The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse.

Touch screen 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen 112 on the front of the device, so that the touch screen may be used as a viewfinder for still and/or video image acquisition. In some embodiments, an optical sensor is located on the front of the device so that the user's image may be obtained for videoconferencing while the user views the other video conference participants on the touch screen. In some embodiments, the position of optical sensor 164 can be changed by the user (e.g., by rotating the lens and the sensor in the device housing) so that a single optical sensor 164 may be used along with the touch screen for both video conferencing and still and/or video image acquisition.

Device 100 may also include one or more proximity sensors 166. In some embodiments, the proximity sensor turns off and disables touch screen 112 when the electronic device is placed near the user's ear (e.g., when the user is making a phone call).

Device 100 may also include one or more accelerometers 168. FIG. A shows accelerometer 168 coupled to peripherals interface 118. Alternately, accelerometer 168 may be coupled to an input controller 160 in I/O subsystem 106. In some embodiments, information is displayed on the touch screen in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 2. Device/global internal state 157 includes one or more of: active application state, indicating which applications, if any, are currently active; display state, indicating what applications, views or other information occupy various regions of touch screen 112; sensor state, including information obtained from the device's various sensors and input control devices 116; and location information concerning the device's location and/or attitude.

Operating system 126 (e.g., Darwin, RTXC, LINUX, UNIX, OS X. WINDOWS, Android, iOS, Sailfish, Symbian, BlackBerry OS, Windowsphone, Windows mobile or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.).

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detects contact on a touchpad. In some embodiments, contact/motion module 130 and controller 160 detects contact on a click wheel.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like. In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, browser 147, and any other application that needs text input).

GPS module 135 determines the location of the device and provides this information for use in various applications (e.g., to telephone 138 for use in location-based dialing and to applications that provide location-based services such as weather widgets, local yellow page widgets, and map/navigation widgets).

Applications 136 may include the following modules (or sets of instructions), or a subset or superset thereof:

contacts module 137 (sometimes called an address book or contact list);

telephone module 138;

image management module 144;

video player module 145;

music player module 146; and/or web browser module 147;

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 may be used to manage an address book or contact list (e.g., stored in application internal state 192 of contacts module 137 in memory 102 or memory 270), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with touch screen 112, display controller 156, contact/motion module 130, graphics module 132, and text input module 134, image management module 144 includes executable instructions to arrange, modify (e.g., edit), or otherwise manipulate, label, delete, present (e.g., in a digital slide show or album), and store still and/or video images.

In conjunction with touch screen 112, display controller 156, contact/motion module 130, graphics module 132, audio circuitry 110, and speaker 111, video player module 145 includes executable instructions to display, present or otherwise play back videos (e.g., on touch screen 112 or on an external, connected display via external port 124).

In conjunction with touch screen 112, display system controller 156, contact/motion module 130, graphics module 132, audio circuitry 110, speaker 111, RF circuitry 108, and browser module 147, music player module 146 includes executable instructions that allow the user to download and play back recorded music and other sound files stored in one or more file formats, such as MP3 or AAC files. In some embodiments, device 100 may include the functionality of an MP3 player.

In conjunction with RF circuitry 108, touch screen 112, display system controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1B:
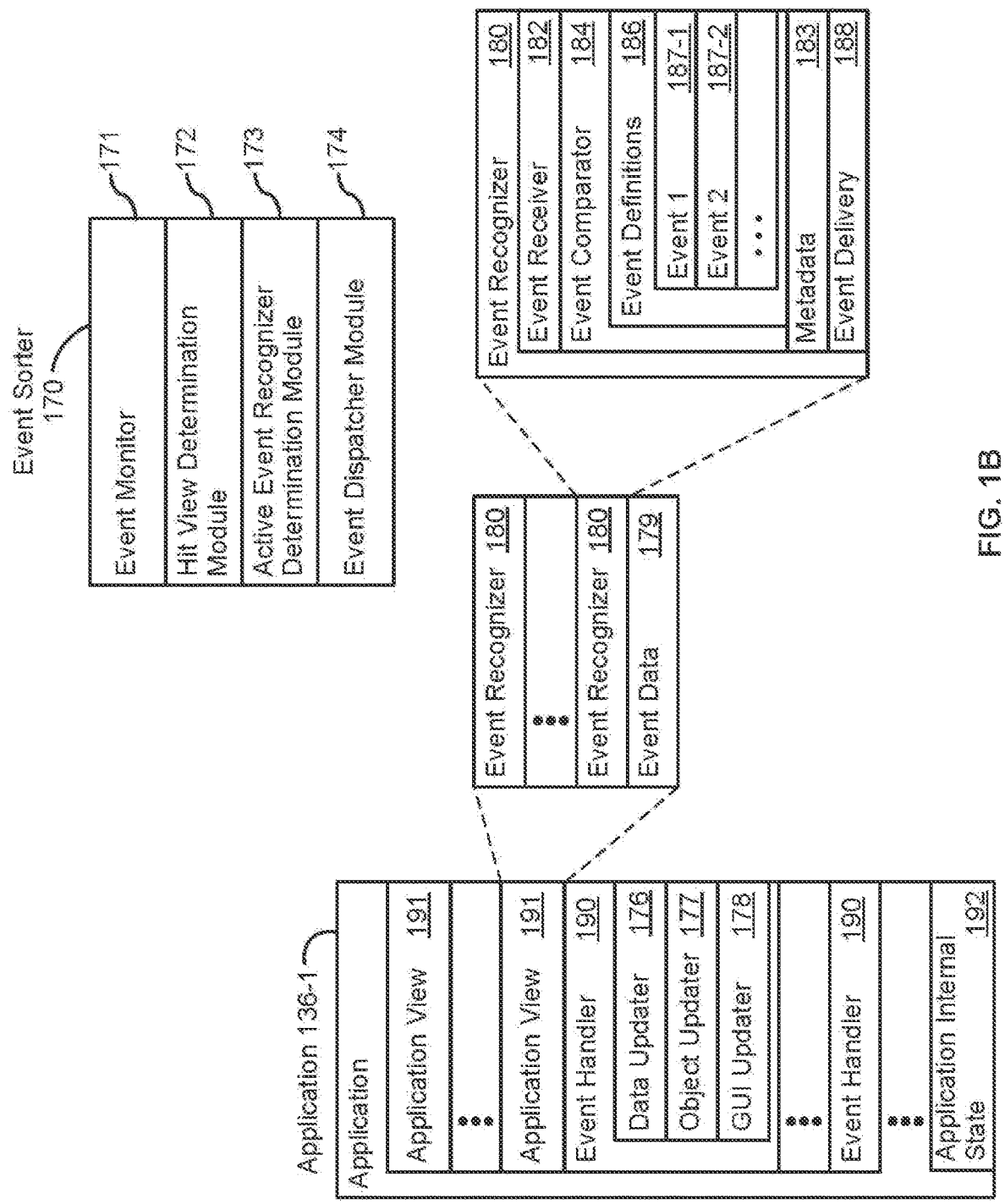
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 270 (FIG. 2A) includes event sorter 170 (e.g., in operating system 126) and a respective application 136-1 (e.g., any of the aforementioned applications 137-147).

Event sorter 170 receives event information and determines the application 136-1 and the application view 191 of application 136-1 to which to deliver the event information. Event sorter 170 includes event monitor 171 and event dispatcher module 174. In some embodiments, application 136-1 includes application internal state 192, which indicates the current application view(s) displayed on touch screen 112 when the application is active or executing. In some embodiments, device/global internal state 157 is used by the event sorter 170 to determine which application(s) is(are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch screen 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch screen 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a predefined event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch screen 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch screen 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch screen 112, when a touch is detected on touch screen 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch screen.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch screens also applies to other forms of user inputs to manipulate the electronic devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2A:
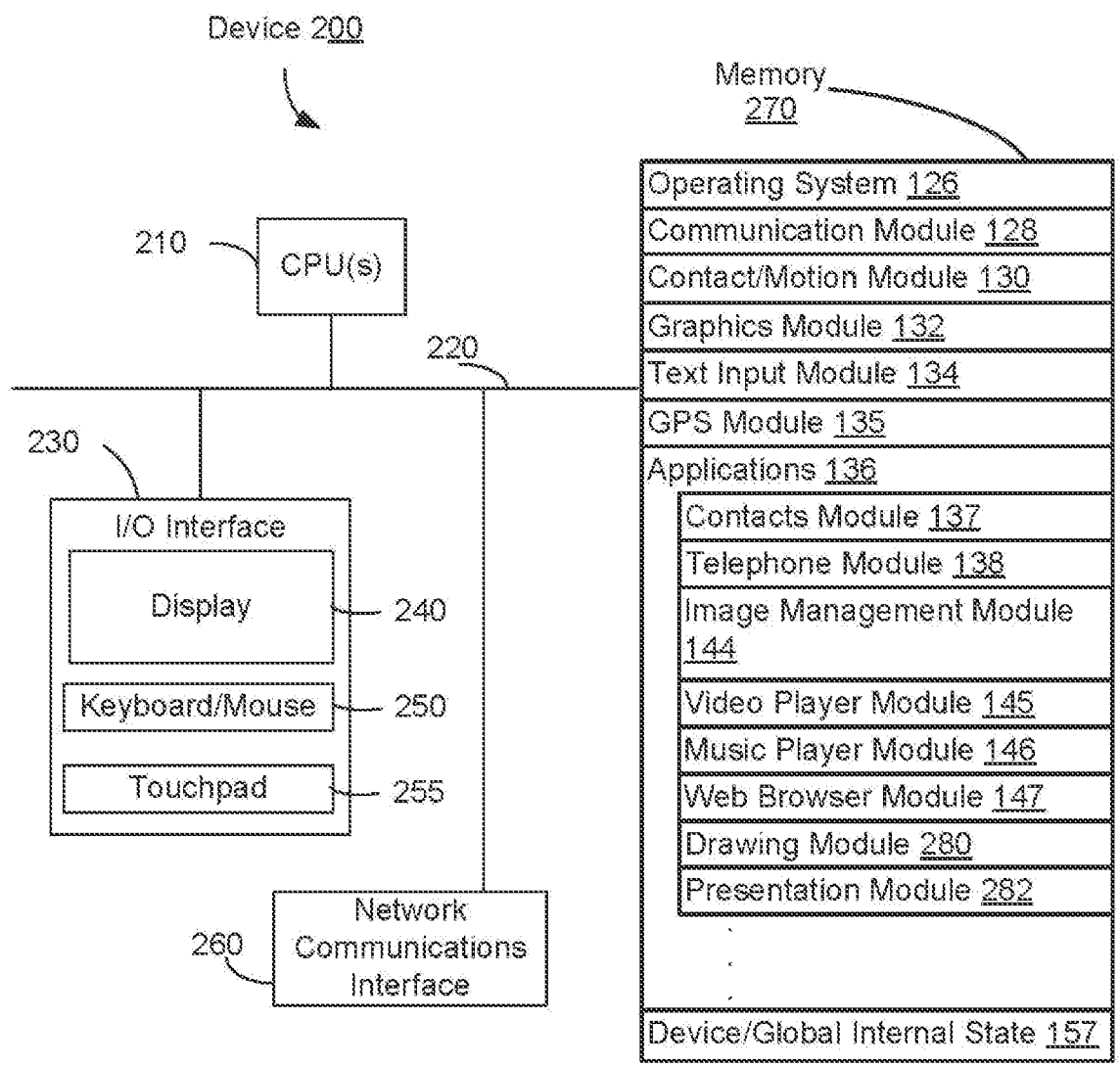
FIG. 2A is a block diagram of an exemplary electronic device with a display and a touch-sensitive surface in accordance with some embodiments.

FIG. 2A is a block diagram of an exemplary electronic device with a display and a touch-sensitive surface in accordance with some embodiments. Device 200 need not be portable. In some embodiments, device 200 is a laptop computer, a desktop computer, a tablet computer, a multimedia player device, a navigation device, an educational device (such as a child's learning toy), a gaming system, or a control device (e.g., a home or industrial controller). Device 200 typically includes one or more processing units (CPU's) 210, one or more network or other communications interfaces 260, memory 270, and one or more communication buses 220 for interconnecting these components. Communication buses 220 may include circuitry (sometimes called a chipset) that interconnects and controls communications between system components. Device 200 includes input/output (I/O) interface 230 comprising display 240, which is typically a touch screen. I/O interface 230 also may include a keyboard and/or mouse (or other pointing device) 250 and touchpad 255. Memory 270 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 270 may optionally include one or more storage devices remotely located from CPU(s) 210. In some embodiments, memory 270 stores programs, modules, and data structures analogous to the programs, modules, and data structures stored in memory 102 of portable electronic device 100 (FIG. 1), or a subset thereof. Furthermore, memory 270 may store additional programs, modules, and data structures not present in memory 102 of portable electronic device 100. For example, memory 270 of device 200 may store drawing module 280 and presentation module 282 while memory 102 of portable electronic device 100 (FIG. 1A) may not store these modules.

Each of the above identified elements in FIG. 2A may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 270 may store a subset of the modules and data structures identified above. Furthermore, memory 270 may store additional modules and data structures not described above.

Figure 2B:
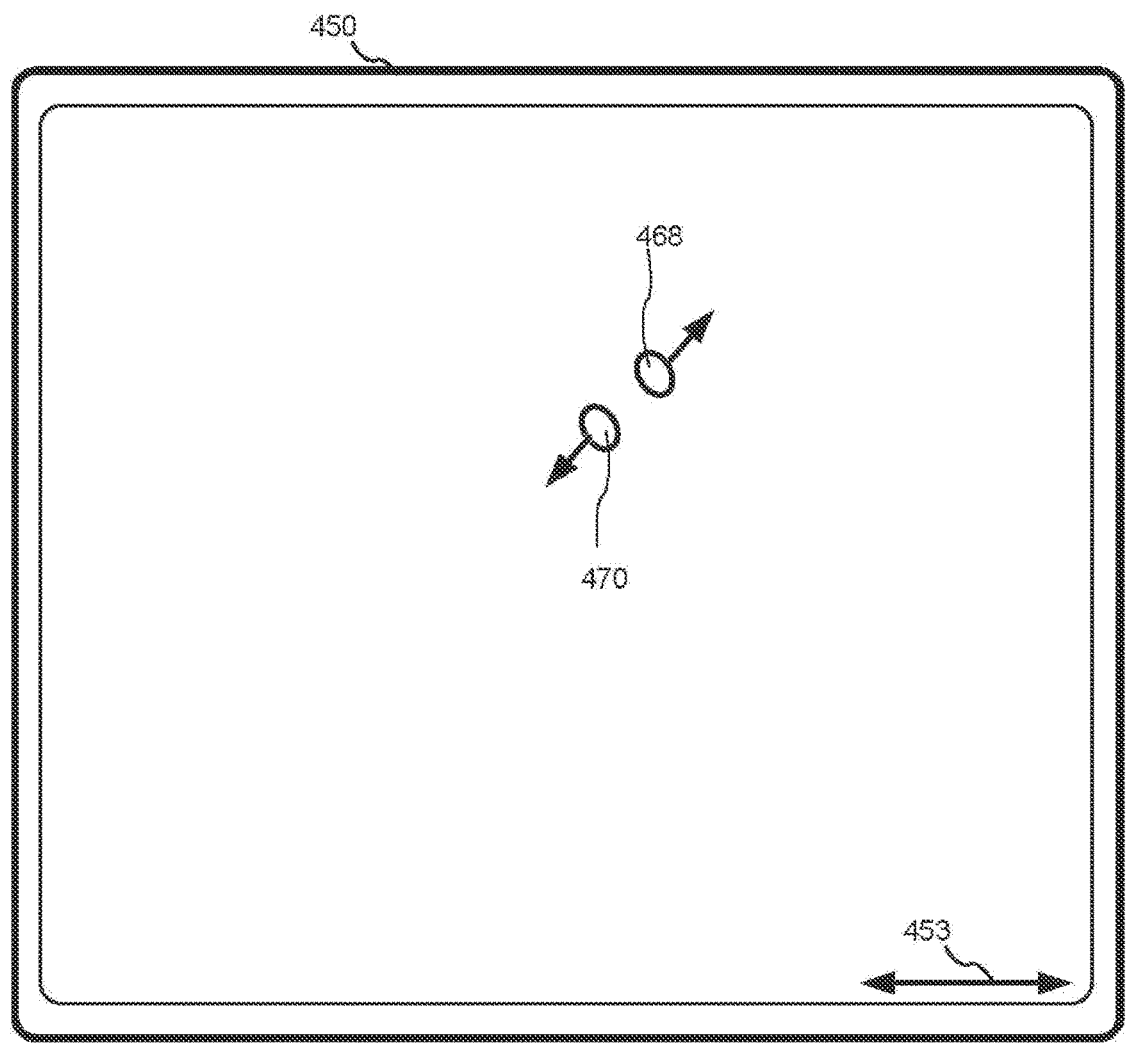
FIG. 2B illustrates an exemplary user interface for an electronic device with a touch-sensitive surface that is separate from the display in accordance with some embodiments.
Figure 2B:
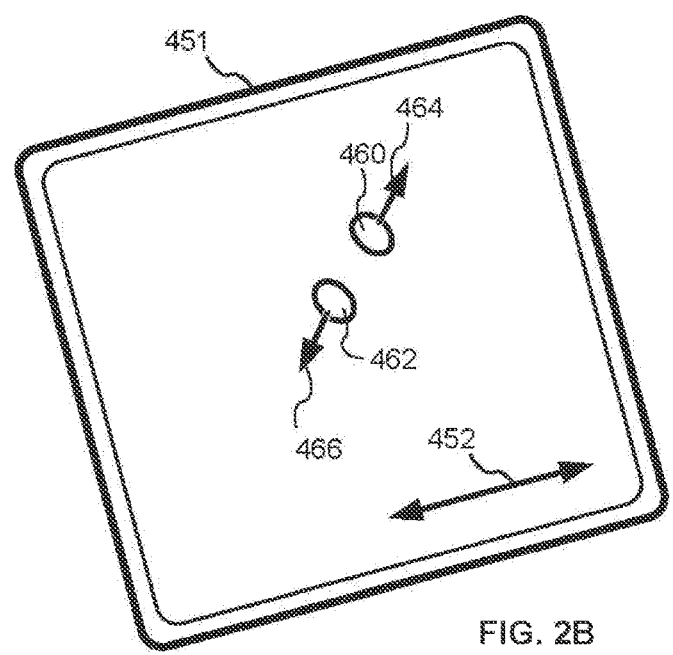

FIG. 2B illustrates an exemplary user interface on a device (e.g., device 200, FIG. 2A) with a touch-sensitive surface 451 (e.g., a tablet or touchpad 255, FIG. 2A) that is separate from the display 450 (e.g., touch screen 112). Although many of the examples which follow will be given with reference to inputs on a touch screen 112 (where the touch sensitive surface and the display are combined), in some embodiments, the device detects inputs on a touch-sensitive surface that is separate from the display, as shown in FIG. 2B. In some embodiments the touch sensitive surface (e.g., 451 in FIG. 2B) has a primary axis (e.g., 452 in FIG. 2B) that corresponds to a primary axis (e.g., 453 in FIG. 2B) on the display (e.g., 450). In accordance with these embodiments, the device detects contacts (e.g., 460 and 462 in FIG. 2B) with the touch-sensitive surface 451 at locations that correspond to respective locations on the display (e.g., in FIG. 2B 460 corresponds to 468 and 462 corresponds to 470). In this way, user inputs (e.g., contacts 460 and 462) detected by the device on the touch-sensitive surface (e.g., 451 in FIG. 2B) are used by the device to manipulate the user interface on the display (e.g., 450 in FIG. 2B) of the electronic device when the touch-sensitive surface is separate from the display. It should be understood that similar methods may be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture may be replaced with a mouse click (e.g., instead of a contact) followed by movement of the cursor along the path of the swipe (e.g., instead of movement of the contact). As another example, a tap gesture may be replaced with a mouse click while the cursor is located over the location of the tap gesture (e.g., instead of detection of the contact followed by ceasing to detect the contact). Similarly, when multiple user inputs are simultaneously detected, it should be understood that multiple computer mice may be used simultaneously, or a mouse and finger contacts may be used simultaneously.

Attention is now directed towards embodiments of user interfaces ("UI") and associated processes that may be implemented on an electronic device with a display and a touch-sensitive surface, such as device 200 or portable electronic device 100.

FIGS. 3A-3K are exemplary user interfaces illustrating manipulating user interface objects on a touch screen in accordance with some embodiments. The user interfaces in these figures are used to illustrate the processes described below in connection with FIGS. 4A-4E. In FIGS. 3A-3K, some finger contact or movement sizes may be exaggerated for illustrative purposes. No depiction in the figures bearing on finger contact or movements should be taken as a requirement or limitation for the purpose of understanding sizes and scale associated with the methods and devices disclosed herein.

Figure 3A:
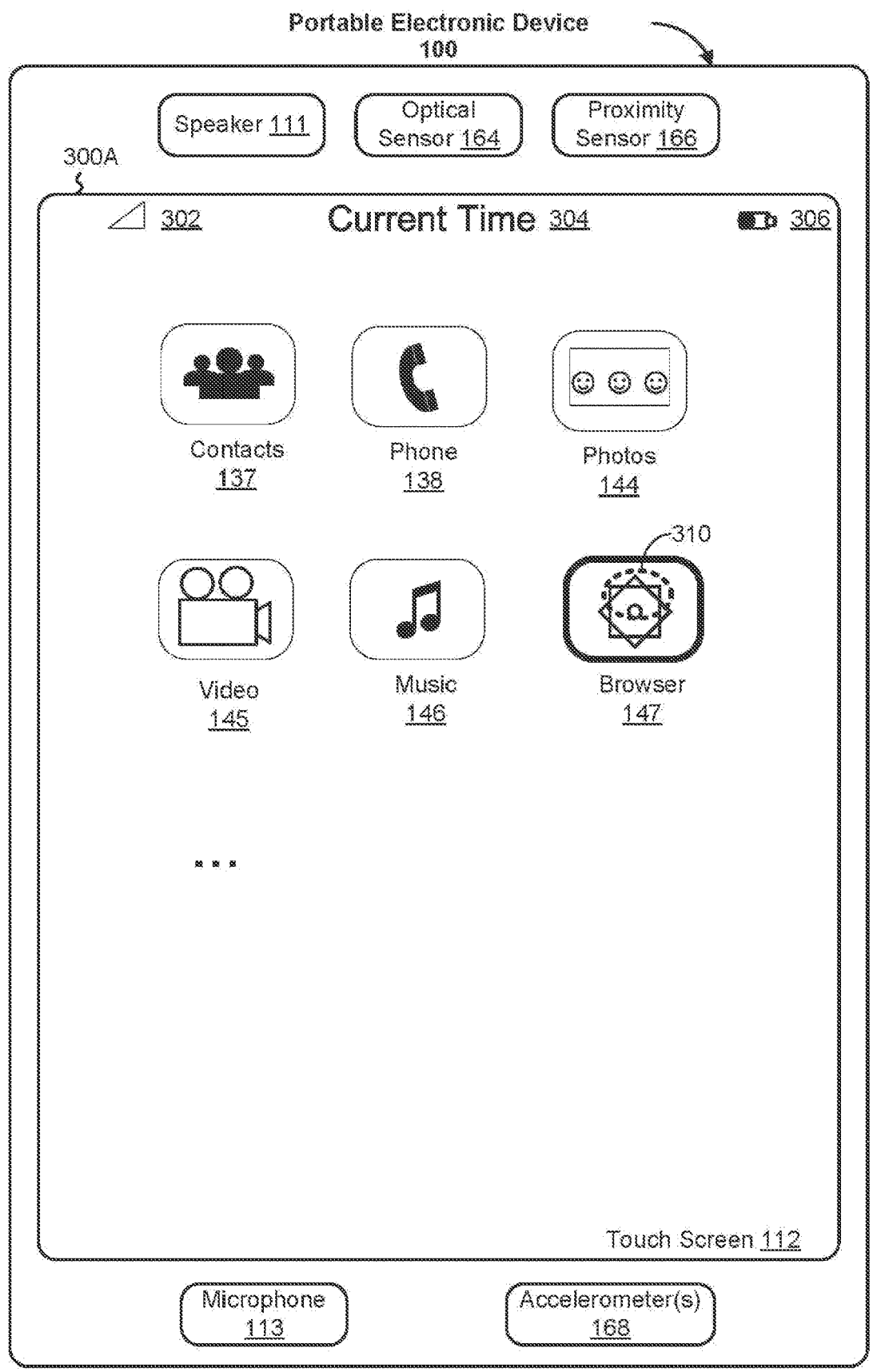

In particular, FIG. 3A is an exemplary user interface for a menu of applications on the portable electronic device 100 in accordance with some embodiments. Similar user interfaces may be implemented on device 200. In some embodiments, the user interface 300A includes the following elements, or a subset or superset thereof:

Signal strength indicator(s) 302 for wireless communication(s), such as cellular and Wi-Fi signals;
Current time 304;
Battery status indicator 306; and
Icons for multiple applications, such as:
Contacts 137;
Phone 138;
Photos 144;
Video player 145;
Music player 146; and
Web browser 147.

A user can select one of the applications by finger tapping a respective icon in the touch screen 112. For example, a finger tap of the icon corresponding to the contacts causes the device 100 to display a list of user contacts on the touch screen 112 retrieved from the user address book stored in the memory 102 of the device 100. The user can select one of the user contacts through another finger tap to make a phone call or send a text message. In this case, if the size of each user contact entry is limited, the touch screen 112 can display multiple user contacts at the same time for the user to choose. However, this convenience may not be able for other applications. For example, if the user selects the web browser icon 147 using a finger tap 310, the web browser application may bring forward multiple windows, each window corresponding to a web page visited by the user in the past. In this case, the touch screen 112 may not have enough space for displaying the multiple windows simultaneously. As will be described below, one aspect of the present application is a method of managing the multiple windows, which may or may not correspond to the same application, in a more efficient and intuitive manner such that the user can quickly spot the window(s) that he or she is looking for and then manipulate the window(s) using predefined finger gestures. Note that the web browser 147 is chosen for illustrative purpose but the method disclosed herein is equally applicable to other types of user interface objects such as videos, images, music albums, etc.

Figure 3B:
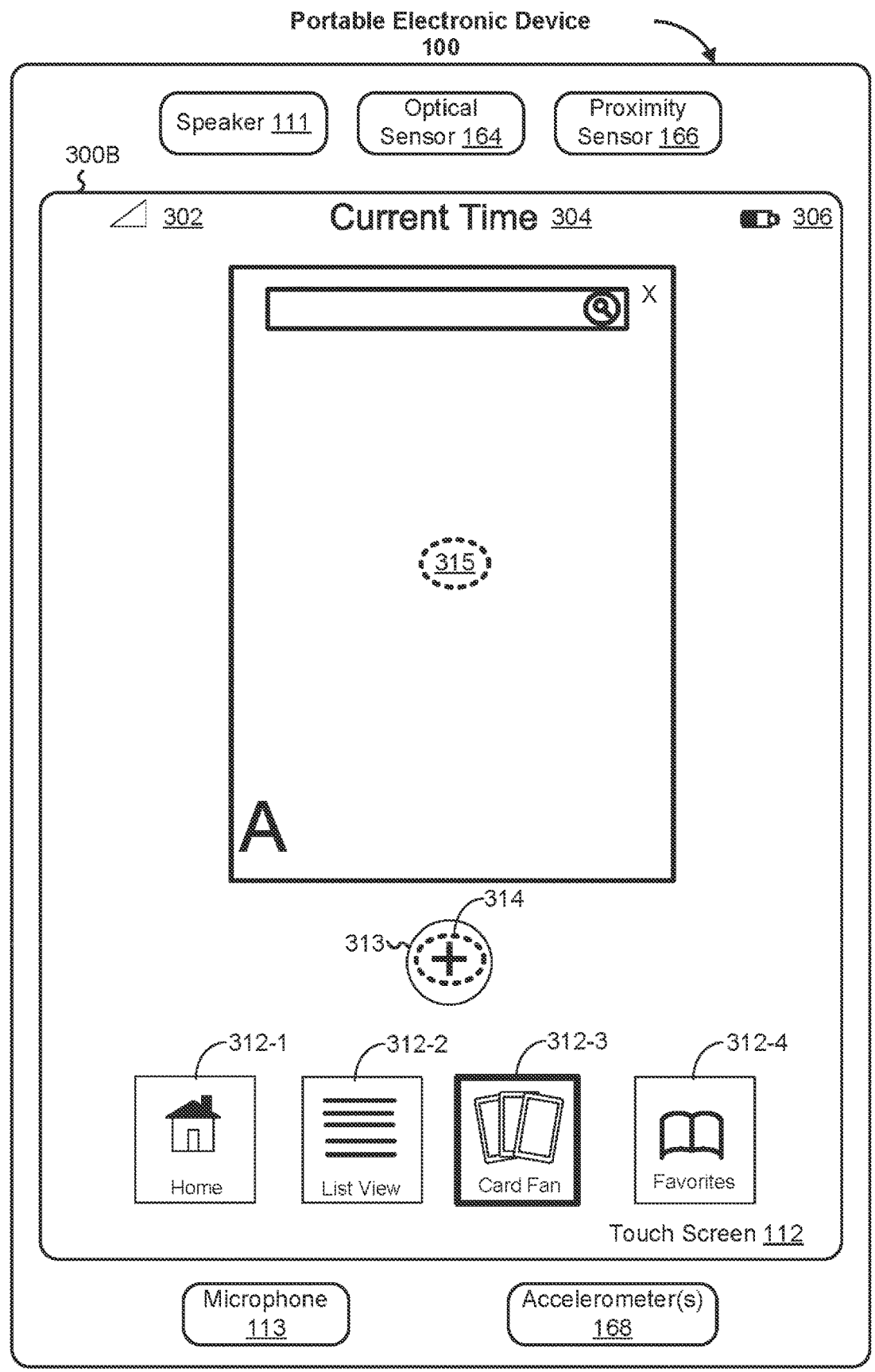

FIG. 3B depicts a user interface 300B that replaces the user interface 300A on the touch screen 112 in response to the user's finger tap 310 of the icon corresponding to the web browser application 147. At the bottom of the touch screen 112, there are a home screen icon 312-1, a list view icon 312-2, a card fan icon 312-3, and a favorites icon 312-4. A user selection of the home screen icon 312-1 brings back the user interface 300A, which is the home screen of the device 100. A user selection of the list view icon 312-2 renders the user interface objects (e.g., web pages windows in this example) in a list view. The user can then scroll the list view to spot the web page window that he or she is looking for. As indicated by its name and shown by the icon itself, a user selection of the card fan icon 312-3 renders the user interface objects like a fan of cards, each card corresponding to one of the web page windows. In this example, it is assumed that the card fan icon 312-3 has been selected by the user previously. Therefore, when the user finger taps the web browser application's icon in FIG. 3A, the card fan icon 312-3 is automatically highlighted as shown in FIG. 3B. At any time, the user can switch between different view modes by finger tapping the corresponding icons shown near the bottom of the touch screen 112.

Right above the four icons is a soft key 313 for adding new user interface objects (in this example, web page windows) to the touch screen 112. Assuming that the web browser application does not have any web page that the user has visited before, the user interface 300B should start with an empty space above the soft key 313. In response to a user finger tap 314 of the soft key, a first web browser window "A" is shown in the user interface 300B. By default, the first web browser window "A" is located near the center of the touch screen 112. Note that the size of the web browser window "A" is configured such that it is large enough to occupy most empty space above the soft key 313. Another user finger tap 315 of the web browser window "A" then brings the window to an even larger size, e.g., the size of the entire user interface 300B. The user can then enter search queries or website addresses through the input box at the top of the web browser window to browse the Internet.

Figure 3C:
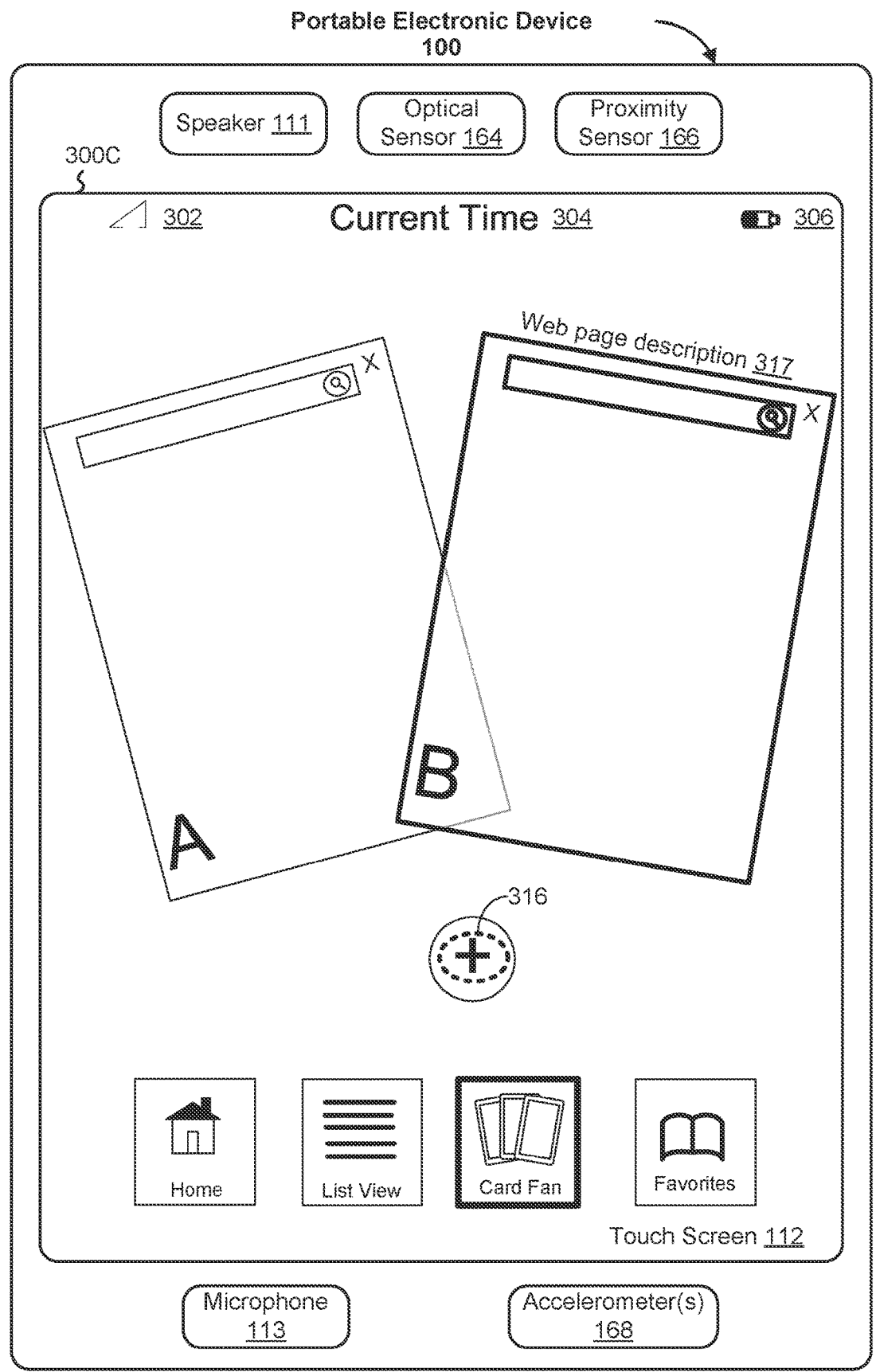

In some embodiments, the user may open multiple web browser windows at the same time with different windows providing different contents. FIG. 3C is an exemplary user interface 300C that includes two web browser windows "A" and "B" displayed in a card fan manner. To generate the user interface 300C, the device updates the total number of web browser windows to be displayed and their respective display locations on the touch screen 112. Note that the lower right corner of the web browser window "A" is shown to be behind the lower left corner of the web browser window "B" to indicate that there is a sequence between the different windows. For example, the sequence may correspond to a chronological order in which the web browser windows were opened. In this example, the web browser window "B" is highlighted using either colors or text 317 or both to suggest that this is the most recently opened web browser window and therefore sits on top of the other windows. In some embodiments, as shown in FIG. 3C, the overlapped region is at least partially transparent so that the portion of the window "A" behind the window "B" is visible. In other embodiments, the overlapped region is opaque such that the user the portion of the window "A" behind the window "B" is invisible.

Figure 3D:
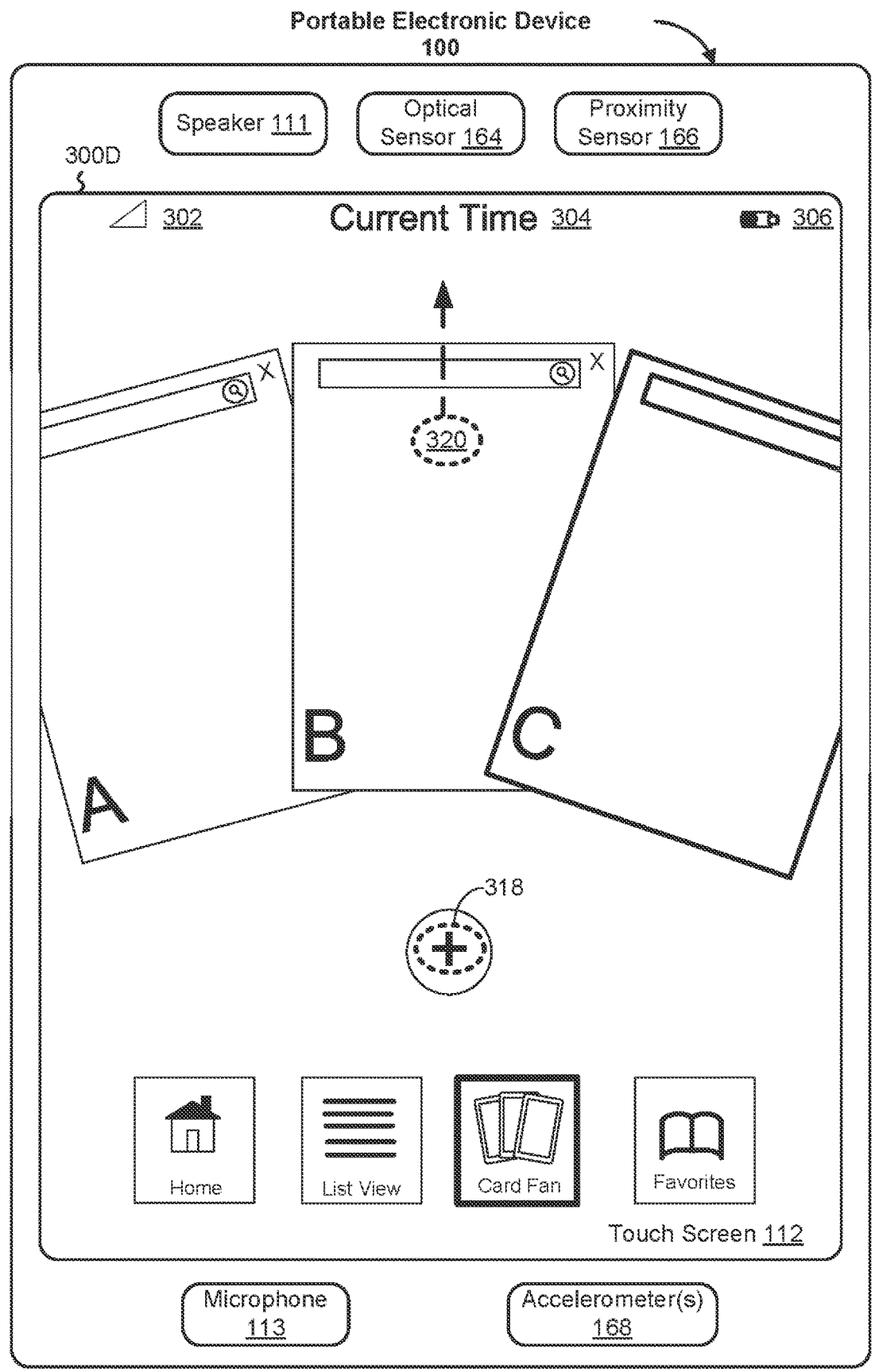
Figure 3E:
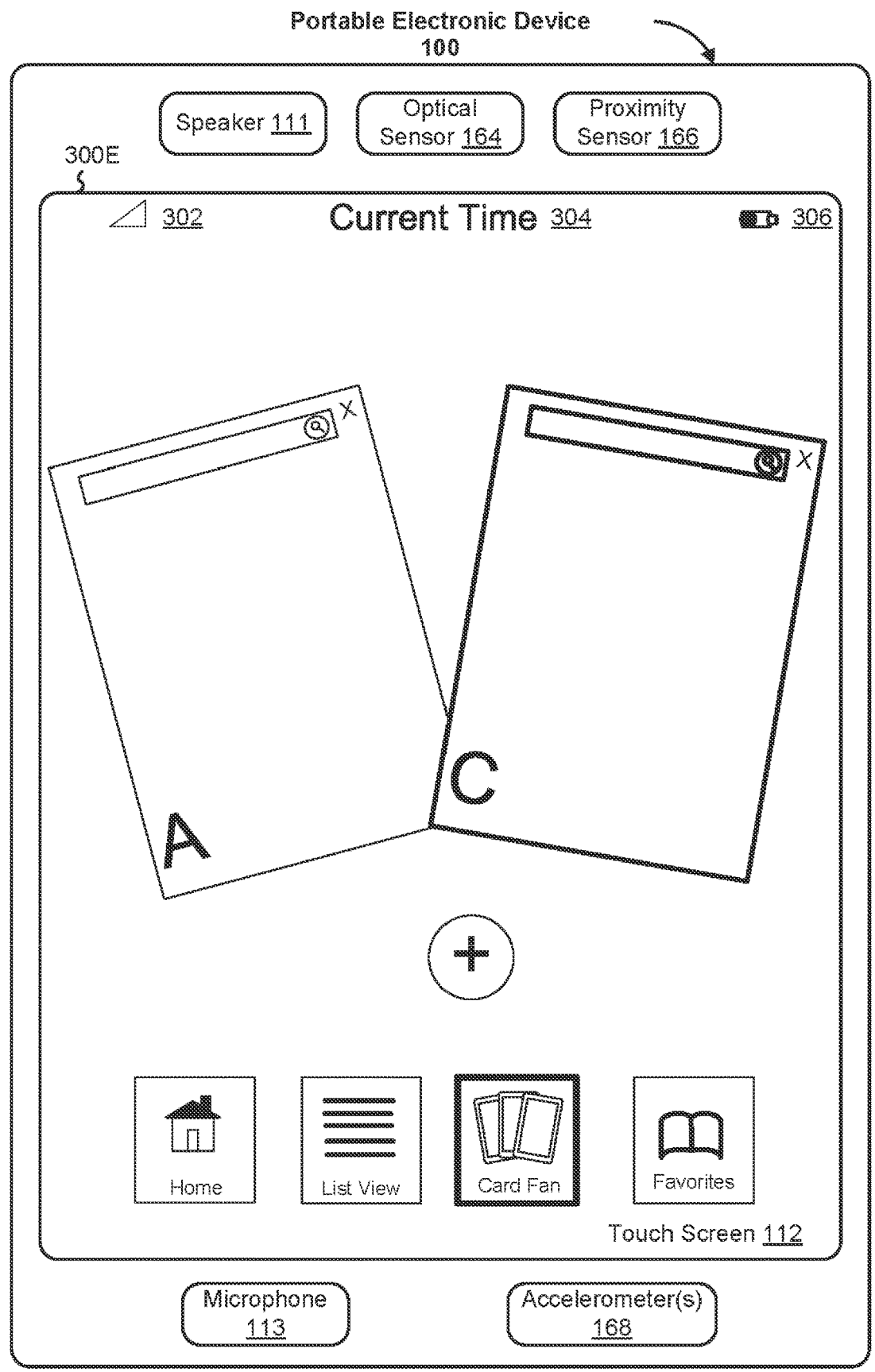

FIG. 3D is an exemplary user interface 300D that includes three web browser windows "A," "B," and "C." For example, the window "C" is added to the touch screen 112 in response to a user finger tap 318 of the soft key. Similarly, the three windows are displayed in the card fan manner. But compared with the user interface 300C, the orientations of the windows "A" and "B" are changed to save room for the window "C." In some embodiments, in order to add a new window to the touch screen 112, the device 100 changes not only the orientations of the existing windows on the touch screen 112 but also their respective sizes. For example, the size of the window "A" in the user interface 300B is greater than that of the same window in the user interface 300C, which is then greater than that of the same window in the user interface 300D.

In some embodiments, the transition from the user interface 300B (FIG. 3B) to the user interface 300C (FIG. 3C) and then to the user interface 300D (FIG. 3D) is an animated process, which includes rotating the window "A" from the portrait position in FIG. 3B to the tilted position in FIG. 3C and to the further tilted position in FIG. 3D. For each web browser window, the device 100 determines its new tilt angle based on the total number of windows to be displayed and the window's position in the sequence according to a set of predefined criteria. For example, the window is shown in the portrait manner like in FIG. 3B if there is only one window to display. If there are two or more windows, the device 100 then calculates an angle difference between two adjacent windows based on the total number of windows to be displayed on the touch screen 112 and the maximum and minimum tilt angles of the leftmost and rightmost windows. For example, if there are six windows and the maximum and minimum tilt angles are 150-degree and 30-degree, the angle difference between two adjacent windows can be defined as (150–30)/5=24-degree. In some embodiments, the angle difference between two adjacent windows is not a constant but varies depending on the positions of the two adjacent windows in the sequence of windows to be displayed. For example, the angle difference between two adjacent windows that are near the top of the card fan (i.e., more recently opened) is greater than the angle difference between two adjacent windows that are near the bottom of the card fan. Similarly, the web browser windows displayed together on the touch screen 112 may be different such that the more recently opened windows are bigger than the less recently opened windows (i.e., the windows that have been opened for some time).

Given a card fan of web browser windows, the user can manipulate them in a more intuitive manner. For example, the user can apply a finger swipe gesture to a web browser window to the close the window. As shown FIGS. 3D and 3E, in response to a user finger swipe gesture 320 towards the top of the touch screen 112, the window "B" is dynamically removed from the card fan and the user interface 300D then animatedly changes to the user interface 300E. Note that the user interface 300E is similar to the user interface 300C because both user interfaces include two windows.

Like adding a new window to the touch screen 112, the removal of an existing window from the touch screen 112 also triggers an update to the display location (including orientation) of each web browser window and optionally their respective display sizes. In some embodiments, the device 100 always keeps a window at the center location of the touch screen 112 (i.e., the location occupied by the window "B" in the user interface 300D of FIG. 3D). Therefore, when the window "B" is removed from the touch screen 112, the device 100 causes the window "C" to occupy the position left by the window "B."

Figure 3F:
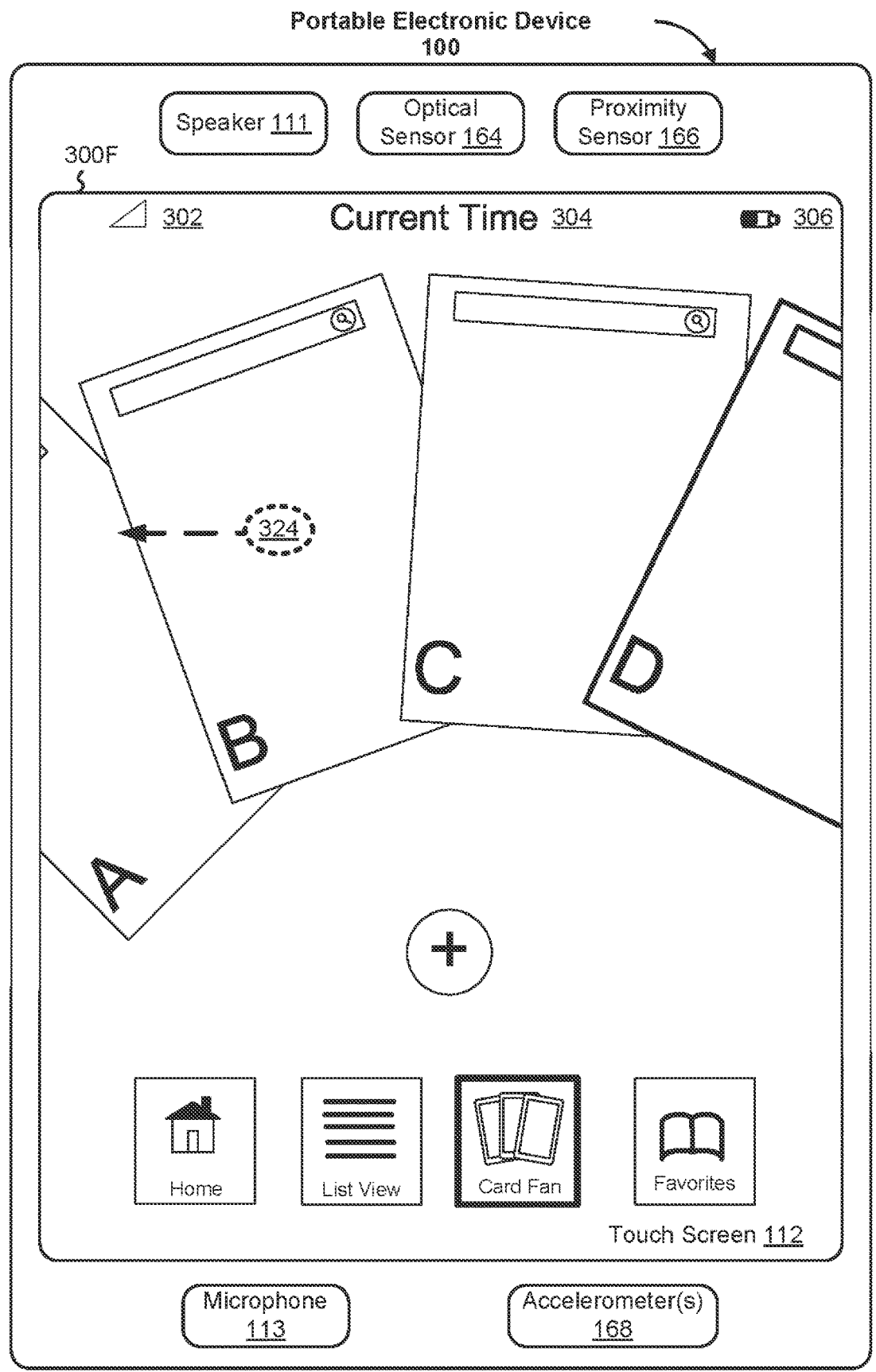

In some embodiments, the device 100 sets multiple limits for displaying the web browser windows on the touch screen 112. For example, there is a maximum number (e.g., four) of web browser windows to be displayed together on the touch screen 112. If the web browser application 147 has more than four opened windows, the user can "scroll" them on the touch screen 112 using finger movements. FIG. 3F is a user interface 300F illustrating the movement of a card fan of web browser windows in response to a leftward finger swipe gesture 324. In this case, the device 100 rotates the windows counterclockwise in the card fan manner by a first degree defined by the leftward finger swipe gesture 324 while maintaining their positions relative to each other. Similarly, in response to a rightward finger swipe gesture, the device 100 rotates the windows clockwise in the card fan manner by a second degree defined by the rightward finger swipe gesture while maintaining their locations relative to each other.

Figure 3G:
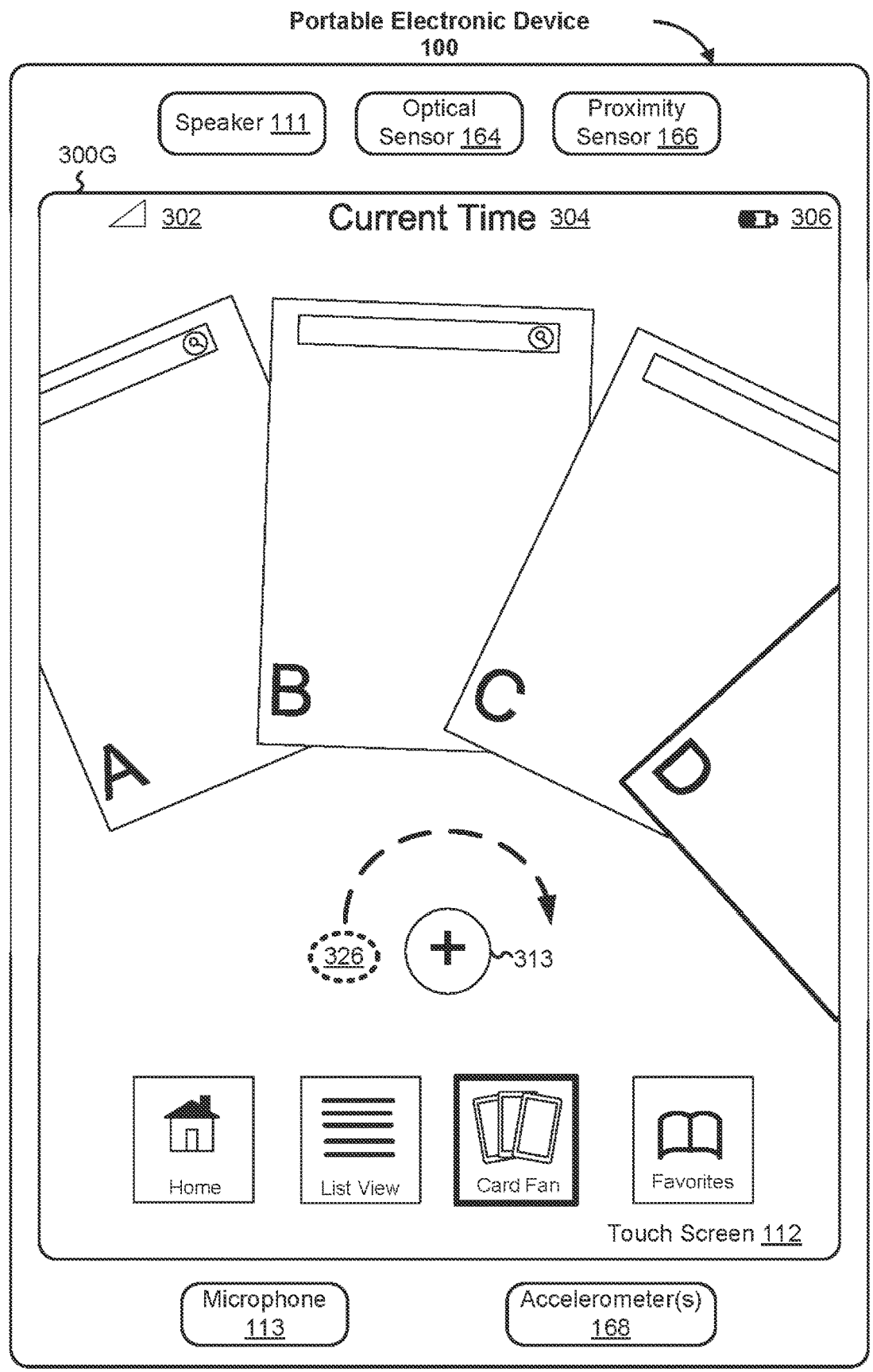

Alternatively, the device 100 rotates the card fan of web browser windows in response to detecting a circular finger movement on the touch screen. FIG. 3G is an exemplary user interface 300G illustrating the clockwise rotation of the web browser windows in the card fan manner in response to a clockwise finger movement around the soft key. In other words, the circular finger movement simulates the operation of a click wheel such that the device 100 rotates the windows in the card fan manner in a direction consistent with the circular finger movement while maintaining their positions relative to each other and stops the rotation when the circular finger movement terminates (e.g., upon detecting a finger-up event).

Figure 3I:
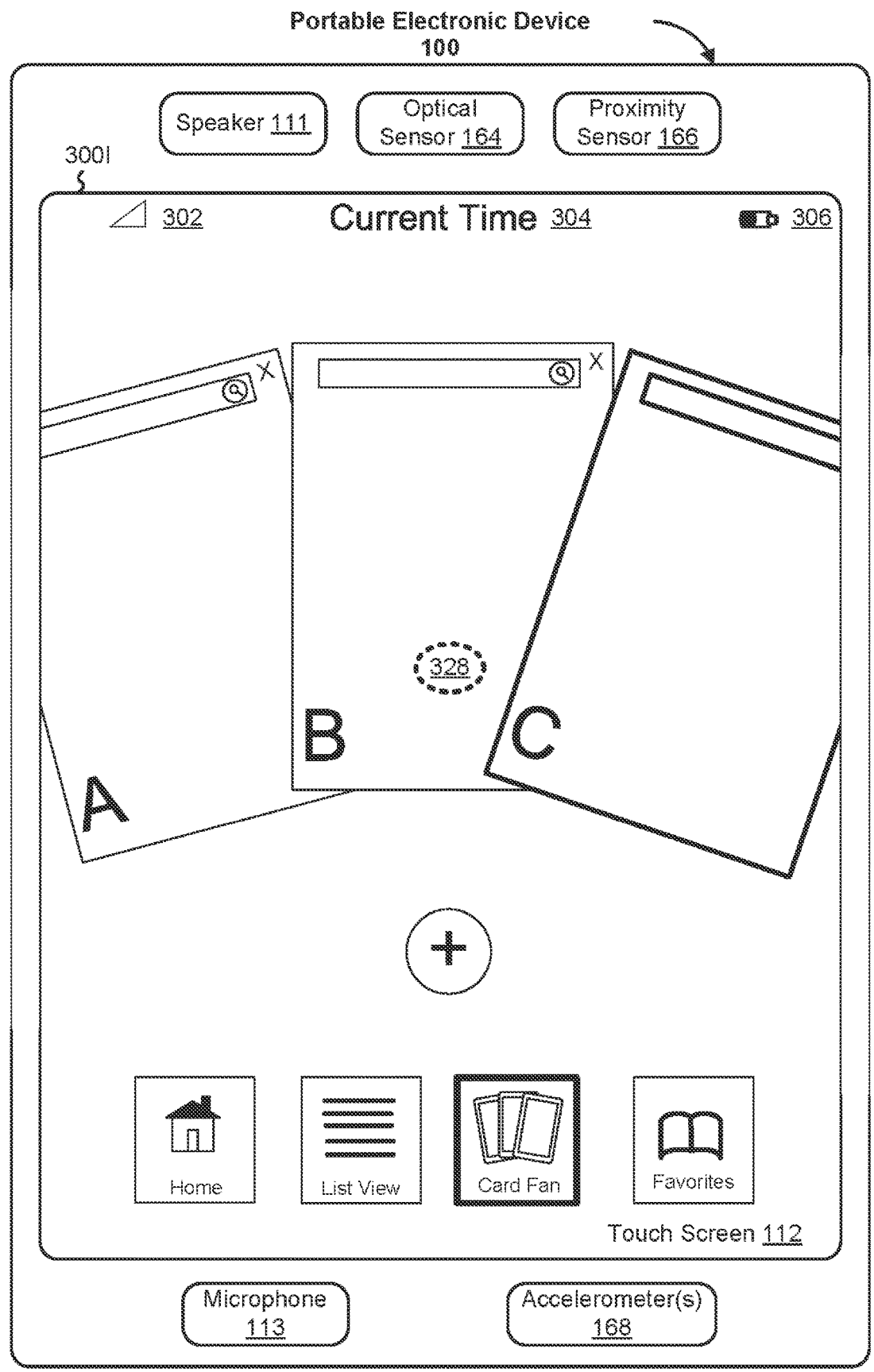
Figure 3J:
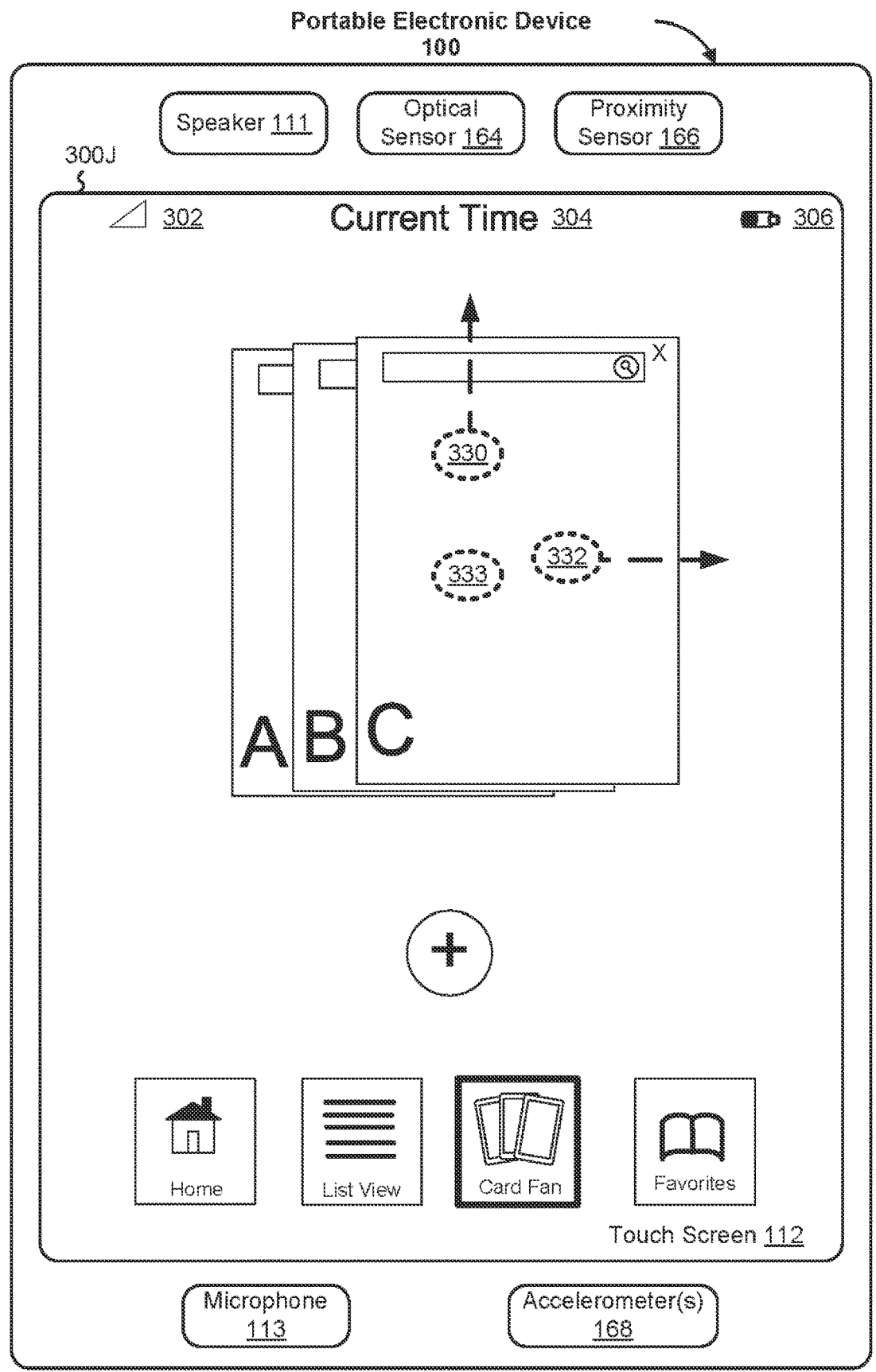

In some embodiments, the device 100 sets a time limit to distinguish finger tap gestures of different durations differently. FIG. 3I is an exemplary user interface 300I including three web browser windows "A." "B," and "C." In response to detecting a user finger tap gesture 328, the device 100 determines the length of the finger tap gesture (e.g., the time difference between the finger-down event and the finger-up event). If the finger tap gesture is less than a predefined time interval (e.g., one second), the device 100 interprets the finger tap gesture as enlarging the finger-tapped window to its full size. In other words, the finger tap gesture indicates that the user wants to access the web page displayed in the web browser window, which triggers the web browser application to retrieve an updated version of the web page from the corresponding web server. If the finger tap gesture is equal to or greater than the predefined time interval, the device 100 interprets the finger tap gesture as a user instruction to collapse the web browser windows from the card fan manner to a card stack manner as shown in the user interface 300J of FIG. 3J. Comparing the user interface 300D with the use interface 300J, it is worth noting that the windows displayed in the card fan manner (e.g., the user interface 300D) all have different orientation angles but the windows displayed in the card stack manner (e.g., the user interface 300J) have the same orientation angle.

After the windows are organized in the card stack manner, the user can then apply different finger swipe gestures to achieve different outcomes. For example, in response to the finger swipe gesture 330 in the vertical direction, the device 100 removes all the windows in the stack from the touch screen 112. But in response to the finger swipe gesture 332 in the horizontal direction (i.e., perpendicular to the finger swipe gesture 330), the device 100 dynamically restores the user interface 300I in which the windows are displayed in the card fan manner.

Figure 3K:
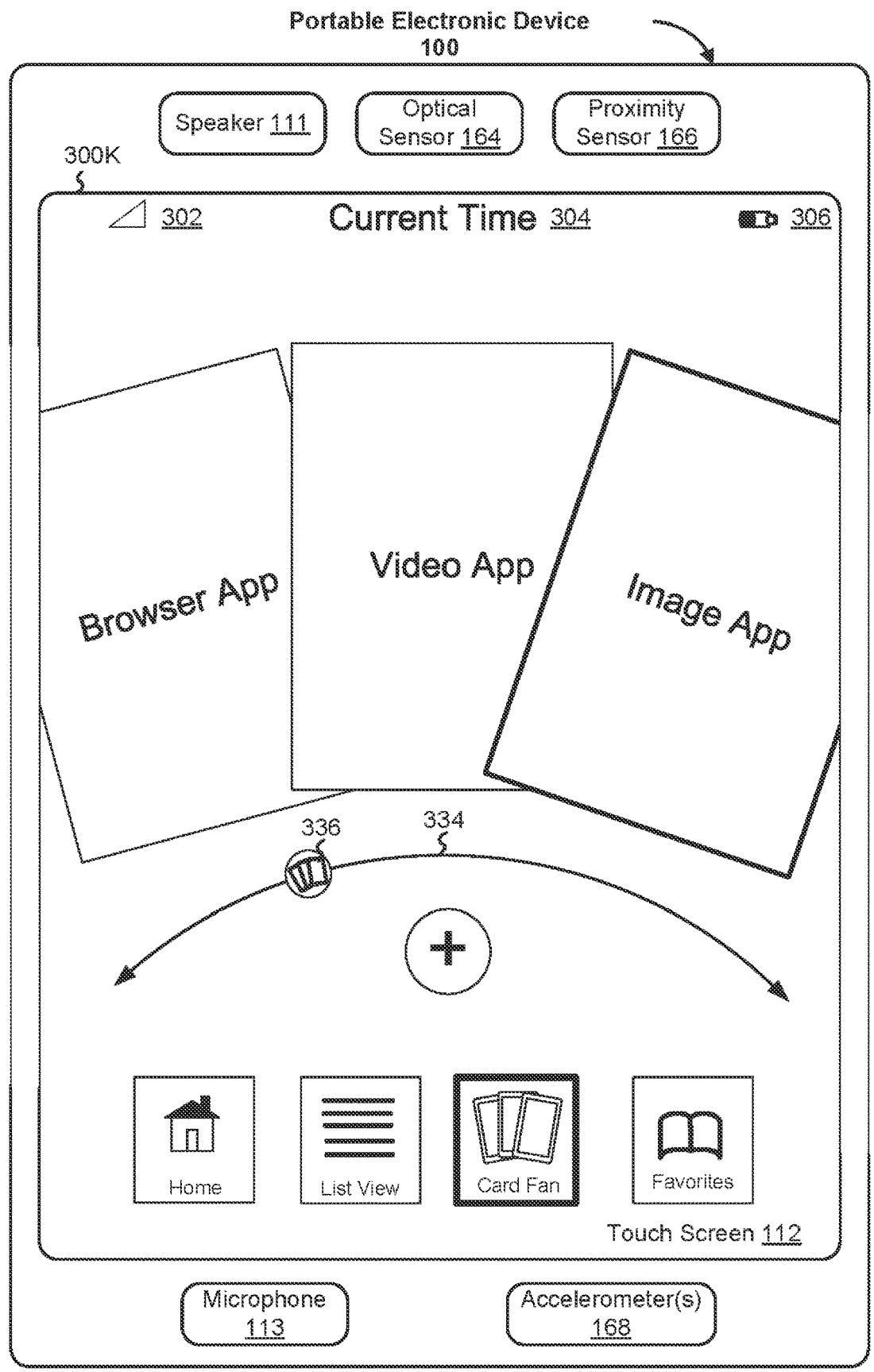

The description above illustrates a set of windows that correspond to different instances of the same application running on the device 100. FIG. 3K is an exemplary user interface 300K that includes windows corresponding to instances of different applications, e.g., a browser application, a video application, and an image application. Note that the same operation heuristics described above in connection with the web browser windows is also applicable to a set of windows associated with different applications. For example, a long finger tap gesture (e.g., 1.5 second) can dynamically collapse the windows associated with different applications from the card fan manner to the card stack manner. The user can then close all the windows (and their associated applications) using a vertical finger swipe gesture.

In some embodiments, the device 100 limits the total number of windows to be displayed together on the touch screen 112. In this case, the device 100 may provide a visual cue (e.g., a scroll bar) to indicate which set of windows is currently displayed on the touch screen 112. As shown in FIG. 3K, the scroll bar 334 may be in the shape of an arc with a movable dial icon 336 indicating the location of the windows currently displayed on the touch screen 112. In other words, when the user applies a rightward finger swipe gesture, the device 100 brings forward windows clockwise from the left side of the touch screen 112 and the movable dial icon 336 then moves leftward accordingly. When the user applies a leftward finger swipe gesture, the device 100 brings forward windows counterclockwise from the right side of the touch screen 112 and the movable dial icon 336 then moves rightward accordingly.

FIGS. 4A-4E are flow diagrams illustrating a method 600 of manipulating user interface objects in accordance with some embodiments. Method 600 is performed at an electronic device having a display and a touch-sensitive surface. In some embodiments (e.g., portable electronic device 100, FIG. 1A), the display is a touch screen and the touch-sensitive surface is on the display. In some embodiments (e.g., device 200, FIG. 2A), the display is separate from the touch-sensitive surface. Some operations in method 600 may be combined and/or the order of some operations may be changed.

As described below, the method 600 provides an intuitive way to manipulate user interface objects on the touch-sensitive surface. The method reduces the cognitive burden on a user when manipulating user interface objects, thereby creating a more efficient human-machine interface. For battery-operated computing devices, enabling a user to manipulate user interface objects on the touch-sensitive display faster and more efficiently conserves power and increases the usage time between battery charges.

The device selects (602) one or more windows to be rendered on the touch screen and a display order associated with the selected windows. In some embodiments, the selected windows correspond to instances of one or more applications running on the device. For example, FIG. 3I illustrates a user interface 300I including three web browser windows that correspond to the web browser application 147 and FIG. 3K illustrates a user interface 300K including three windows corresponding to three different applications. The display order is defined by the time sequence of when the windows were opened on the device such that the more recent windows are displayed on top of the old windows. The device then determines (604) a respective display location for each of the selected windows based at least in part on the display order and a total number of the selected windows. FIGS. 3B-3D illustrates that the same window "A" has different display locations when the total number of windows increases from one to three. Finally, the device renders (606) the selected windows on the touch screen according to their respective display locations in a card fan manner (e.g., the user interface 300D of FIG. 3D). As noted above, the selected windows may correspond to instances of different applications running on the electronic device (e.g., the user interface 300K of FIG. 3K) or the same application (e.g., the user interface 300D of FIG. 3D).

The device detects (614) a user instruction to add a new window to the selected windows (e.g., finger taps 314, 316, 318 of FIGS. 3B, 3C, and 3D respectively). In response to the user instruction, the device updates (618) the total number of the selected windows (from one in FIG. 3B to two in FIG. 3C, to three in FIG. 3D) and updates (620) the respective display locations of the selected windows on the touch screen when the updated total number of the selected windows is within a predefined range. For example, the minimum of the predefined range is two and the maximum of the predefined range is infinite. In some embodiments, there is an upper limit on the total number of windows to be displayed together on the touch screen (e.g., five) such that the display positions of five windows on the touch screen are fixed. In some embodiments, the upper limit is dependent on whether the touch screen is in a portrait mode (e.g., the maximum of the range is set to be five in this case) or a landscape mode (e.g. the maximum of the range is set to be eight in this case). Finally, the device dynamically renders (622) the new window and the selected windows on the touch screen according to their respective updated display locations in the card fan manner (e.g., FIGS. 3C and 3D).

In some embodiments (shown in FIG. 4B), the device detects (624) a finger swipe gesture (e.g., 320 in FIG. 3D) on one of the selected windows on the touch screen. In response to the finger swipe gesture (626), the device removes (628) the finger-swiped window from the touch screen (e.g., the user interface 300E of FIG. 3E) and updates (630) the total number of the remaining selected windows. The device may updates (632) the respective display locations of the remaining selected windows on the touch screen when the updated total number of the remaining selected windows is within a predefined range as described above. For example, when the updated total number of the remaining selected windows is still greater than the maximum number of windows to be displayed together on the touch screen, the device does not need to update some of the remaining selected windows if their locations remain the same. Finally, the device dynamically renders (634) the remaining selected windows on the touch screen according to their respective updated display locations in the card fan manner (e.g., the user interface 300E of FIG. 3E).

Figure 4B:
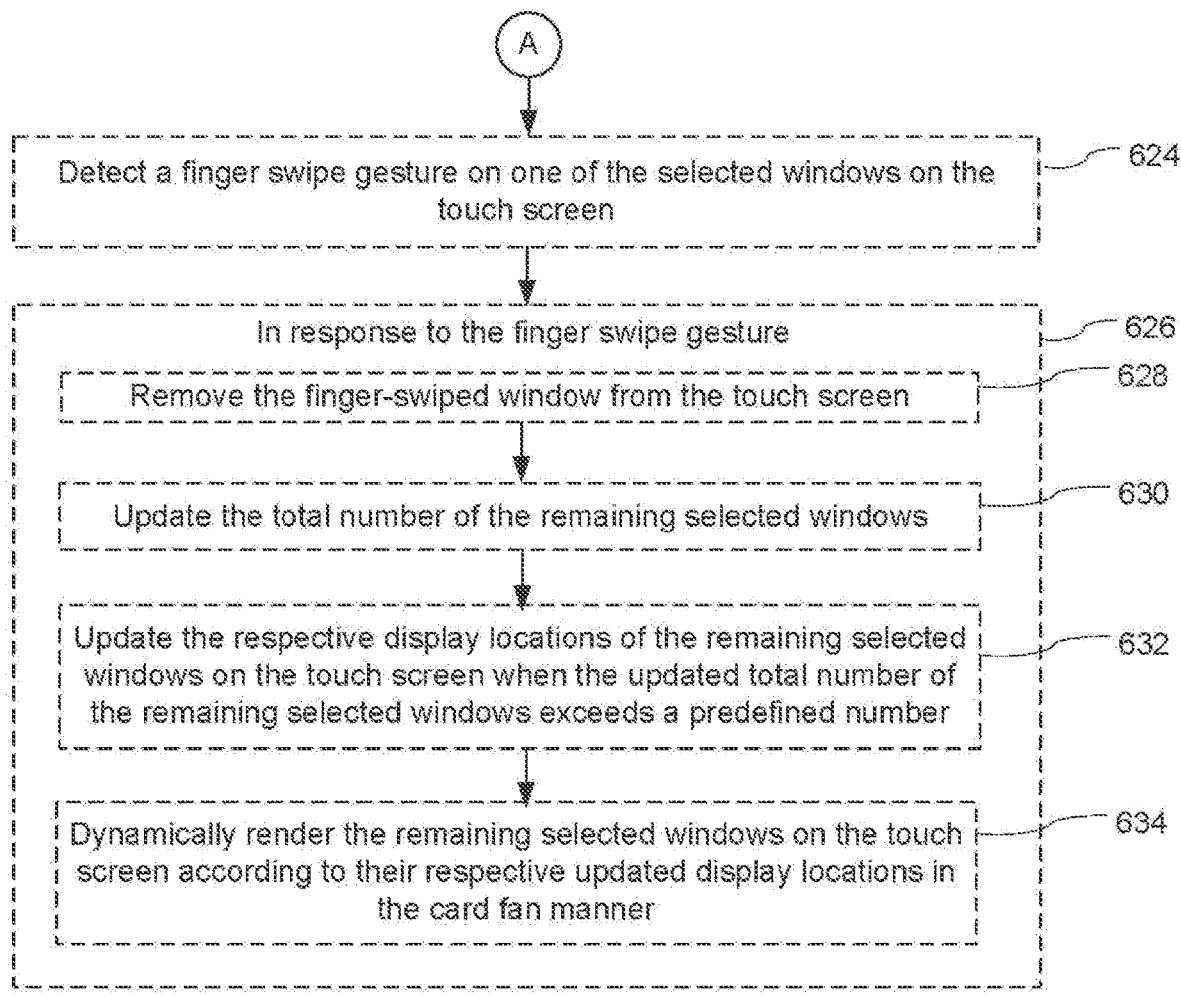
Figure 4C:
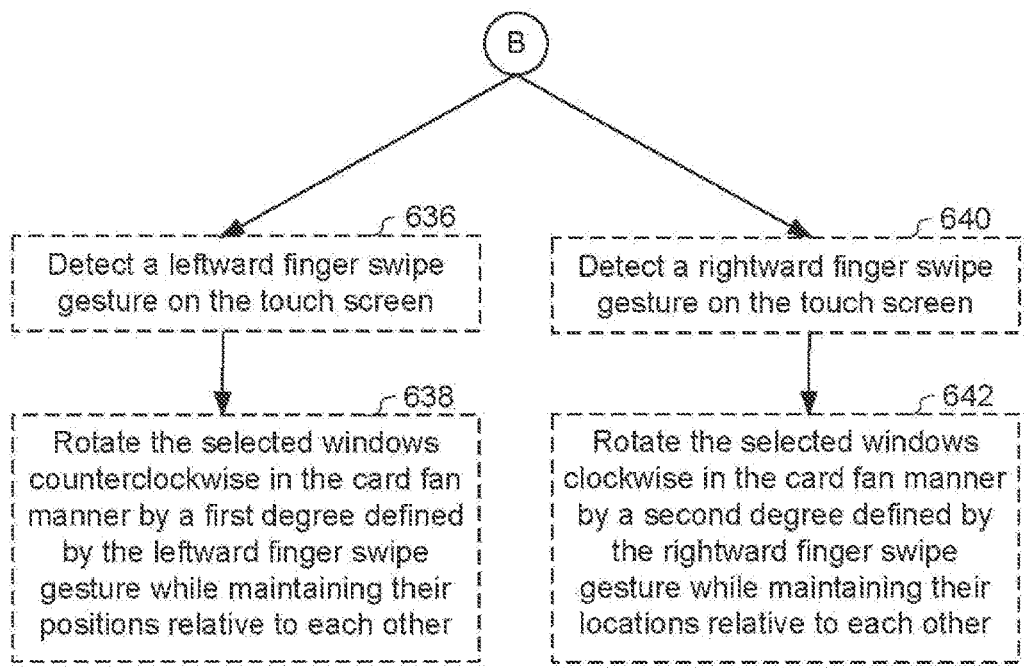
Figure 4D:
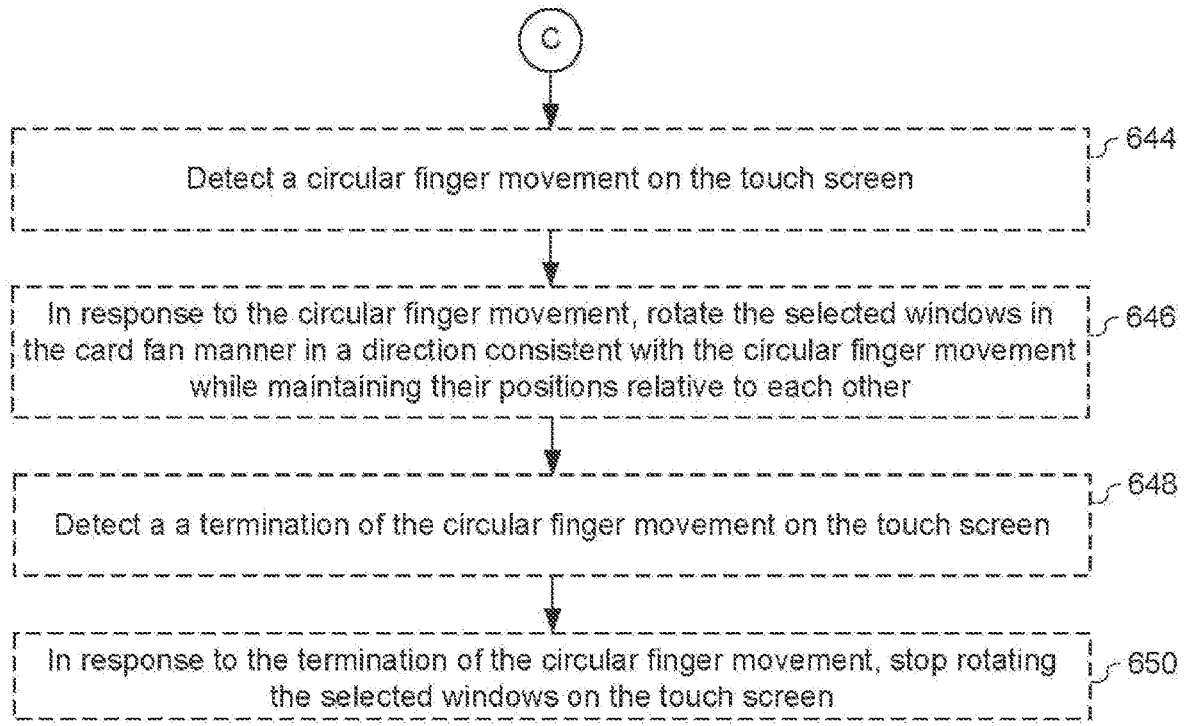
Figure 4E:
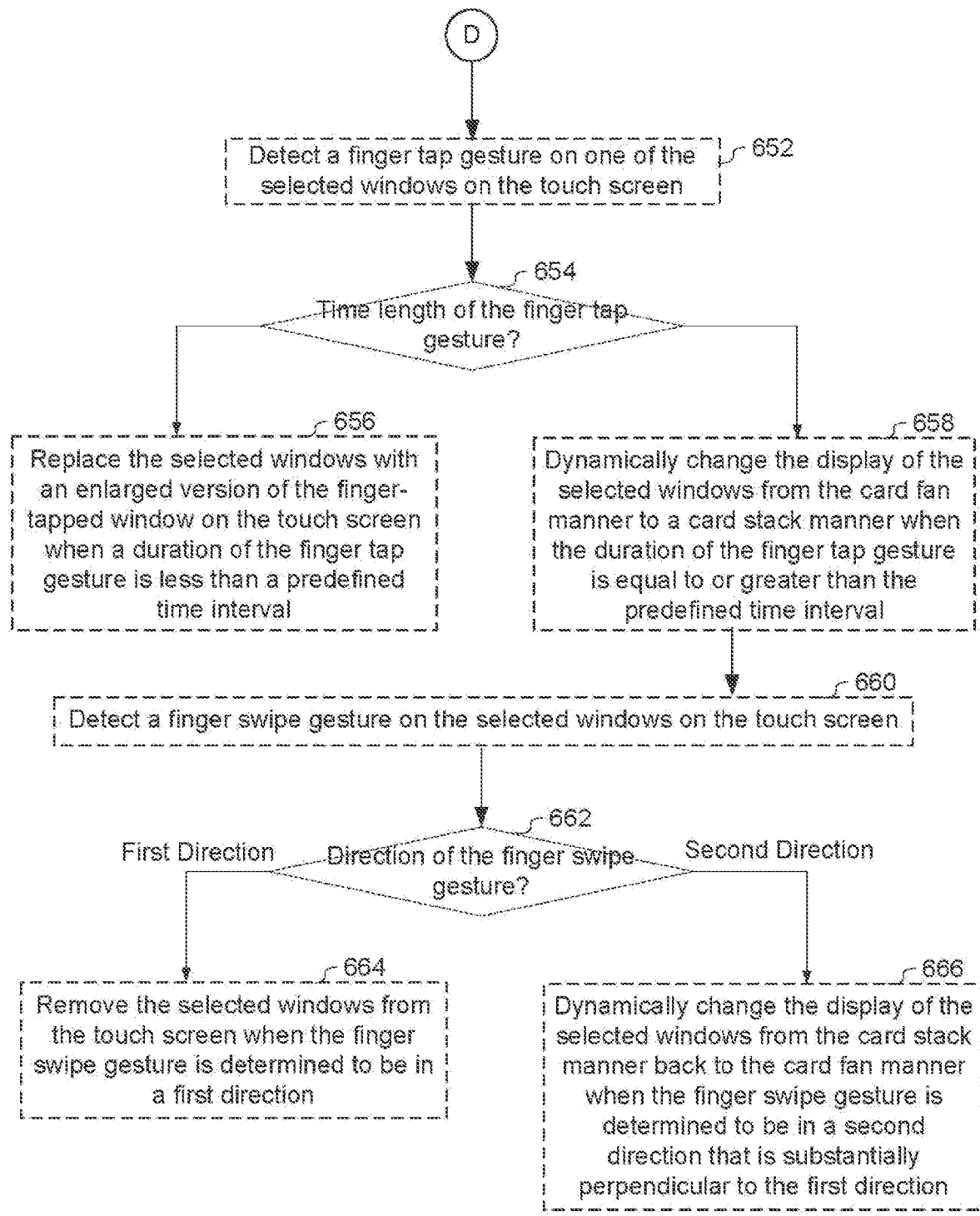

As shown in FIG. 4C, when the device detects (636) a leftward finger swipe gesture (e.g., 324 in FIG. 3F) on the touch screen, the device rotates (638) the selected windows counterclockwise in the card fan manner by a first degree defined by the leftward finger swipe gesture while maintaining their positions relative to each other; when the device detects (640) a rightward finger swipe gesture on the touch screen, the device then rotates (642) the selected windows clockwise in the card fan manner by a second degree defined by the rightward finger swipe gesture while maintaining their locations relative to each other.

In some embodiments, the device detects (644) a circular finger movement (e.g., 326 in FIG. 3G) on the touch screen. In response to the circular finger movement, the device rotates (646) the selected windows in the card fan manner in a direction consistent with the circular finger movement (e.g., clockwise in FIG. 3G) while maintaining their positions relative to each other. After detecting (648) a termination of the circular finger movement on the touch screen, the device then stops (650) rotating the selected windows on the touch screen. In some embodiments, the circular finger movement is required to occur within a predefined area (e.g., surrounding the soft key 313 in FIG. 3G).

In some embodiments, the device detects (652) a finger tap gesture (e.g., 328 in FIG. 3I) on one of the selected windows on the touch screen and then determines (654) the time length of the finger tap gesture. When the duration of the finger tap gesture is less than a predefined time interval (e.g., one second), the device replaces (656) the selected windows with an enlarged version of the finger-tapped window on the touch screen (i.e., the user's finger tap gesture is construed as the user wants to open the finger-tapped window). When the duration of the finger tap gesture is equal to or greater than the predefined time interval, the device then dynamically changes (658) the display of the selected windows from the card fan manner to a card stack manner (e.g., the user interface 300J of FIG. 3J). Note that the selected windows are rendered with different orientation angles on the touch screen when displayed in the card fan manner and rendered with the same orientation angle on the touch screen when displayed in the card stack manner.

After the selected windows are rendered in the card stack manner, the device detects (660) a finger swipe gesture (e.g., 330 and 332 in FIG. 3J) on the selected windows on the touch screen and then determines (662) the direction of the finger swipe gesture. When the finger swipe gesture is determined to be in a first direction (e.g., the gesture 330 moving vertically upward), the device removes (664) the selected windows from the touch screen; when the finger swipe gesture is determined to be in a second direction that is substantially perpendicular to the first direction (e.g., the gesture 332 moving horizontally to the right), the device dynamically changes (666) the display of the selected windows from the card stack manner back to the card fan manner. In some embodiments, in response to a finger swipe gesture in any direction, the device removes the selected windows from the touch screen. But in response to a finger tap gesture (e.g., 333 in FIG. 3J), the device dynamically returns the display of the selected windows from the card stack manner back to the card fan manner.

For example, the operations depicted in FIGS. 4A-4E may be implemented by components depicted in FIGS. 1A and 1B. For example, detection of the finger gestures may be implemented by event sorter 170, event recognizer 180, and event handler 190. Event monitor 171 in event sorter 170 detects a finger gesture on a touch screen 112, and event dispatcher module 174 delivers the event information to application 136-1. In this case, application 136-1 includes methods and graphical user-interfaces for updating the information displayed on the touch screen 112. A respective event recognizer 180 of application 136-1 compares the event information to respective event definitions 186, and determines whether particular gestures have been performed. When the predefined event or sub-event is detected, event recognizer 180 activates an event handler 180 associated with the detection of a respective gesture. Event handler 180 may utilize or call data updater 176 or object updater 177 to update data or a text display region and the application internal state 192. Similarly, it would be clear to a person having ordinary skill in the art how other processes can be implemented based on the components depicted in FIGS. 1A and 1B.

While particular embodiments are described above, it will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for displaying windows on an electronic device, comprising:

at the electronic device having a touch screen, one or more processors and memory storing programs executed by the one or more processors,
- determining a total number of multiple windows rendered on the electronic device and a display order associated with the windows, each window corresponding to a respective application running on the electronic device;
- determining a respective display location for each of the windows based at least in part on the display order and the total number of the windows;
- choosing a smaller number from (i) the total number of the windows and (ii) a pre-configured maximum number of windows to be displayed simultaneously on the touch screen as a current number of windows to be displayed simultaneously on the touch screen;
- determining a first display size for the windows based on the current number of windows to be displayed simultaneously on the touch screen and a size of the touch screen;
- displaying one or more of the windows on the touch screen according to their respective determined display locations and the first display size in a card fan manner;
- in response to (i) a removal of one of the windows from the touch screen and (ii) a determination that the current number of windows to be displayed simultaneously on the touch screen is no greater than the pre-configured maximum number of windows to be displayed simultaneously on the touch screen:
  - increasing the first display size to a second display size;
  - updating the respective display location and a corresponding orientation for each of the windows based on the current number of the windows after the removal of one of the windows; and
  - adjusting the display of each of the windows on the touch screen according to the second display size, the updated respective display location, and the updated corresponding orientation; and
- in response to (i) a rendition of a new window on the electronic device and (ii) a determination that the current number of windows to be displayed simultaneously on the touch screen is less than the pre-configured maximum number of windows to be displayed simultaneously on the touch screen:
  - decreasing the first display size to a third display size;
  - updating the respective display location and the corresponding orientation for each of the windows based on the current number of the windows including the new window; and
  - adjusting the display of each of the windows on the touch screen according to the third display size, the updated respective display location, and the updated corresponding orientation.

2. The method of claim 1, wherein the windows correspond to instances of different applications running on the electronic device.

3. The method of claim 1, wherein the windows correspond to instances of one application running on the electronic device.

4. The method of claim 1, further comprising:
detecting a user instruction to add a new window to the windows;
in response to the user instruction:
  updating the total number of the windows;
  updating the respective display locations of the windows on the touch screen when the updated total number of the windows is within a predefined range;
  updating the respective display size for each of the windows on the touch screen when the updated total number of the windows is less than the maximum number of windows to be displayed simultaneously on the touch screen; and
  dynamically rendering the new window and the windows on the touch screen according to their respective updated display locations and their respective updated display size in the card fan manner.

5. The method of claim 1, further comprising:
detecting a finger swipe gesture on one of the windows on the touch screen;
in response to the finger swipe gesture:
  removing the finger-swiped window from the touch screen;
  updating the total number of the remaining windows;
  updating the respective display locations of the remaining windows on the touch screen when the updated total number of the remaining windows is within a predefined range;
  updating the respective display size for each of the remaining windows on the touch screen when the updated total number of the remaining windows is less than the maximum number of windows to be displayed simultaneously on the touch screen; and
  dynamically rendering the remaining windows on the touch screen according to their respective updated display locations and their respective updated display size in the card fan manner.

6. The method of claim 1, further comprising:
detecting a leftward finger swipe gesture on the touch screen;
in response to the leftward finger swipe gesture, rotating the windows counterclockwise in the card fan manner by a first degree defined by the leftward finger swipe gesture while maintaining their positions relative to each other;
detecting a rightward finger swipe gesture on the touch screen; and
in response to the rightward finger swipe gesture, rotating the windows clockwise in the card fan manner by a second degree defined by the rightward finger swipe gesture while maintaining their locations relative to each other.

7. The method of claim 1, further comprising:
detecting a circular finger movement on the touch screen;
in response to the circular finger movement, rotating the windows in the card fan manner in a direction consistent with the circular finger movement while maintaining their positions relative to each other;
detecting a termination of the circular finger movement on the touch screen; and
in response to the termination of the circular finger movement, stopping rotating the windows on the touch screen.

8. The method of claim 1, further comprising:
detecting a finger tap gesture on one of the windows on the touch screen;
replacing the windows with an enlarged version of the finger-tapped window on the touch screen when a duration of the finger tap gesture is less than a predefined time interval; and
dynamically changing the display of the windows from the card fan manner to a card stack manner when the duration of the finger tap gesture is equal to or greater than the predefined time interval.

9. The method of claim 8, wherein the windows are rendered with different orientation angles on the touch screen when displayed in the card fan manner and rendered with the same orientation angle on the touch screen when displayed in the card stack manner.

10. The method of claim 8, further comprising:
after the windows are rendered in the card stack manner:
detecting a finger swipe gesture on the windows on the touch screen;
removing the windows from the touch screen when the finger swipe gesture is determined to be in a first direction; and
dynamically changing the display of the windows from the card stack manner back to the card fan manner when the finger swipe gesture is determined to be in a second direction that is substantially perpendicular to the first direction.

11. The method of claim 8, further comprising:
after the windows are rendered in the card stack manner:
detecting a finger gesture on the windows on the touch screen;
removing the windows from the touch screen when the finger gesture is determined to be a finger swipe gesture; and
dynamically changing the display of the windows from the card stack manner back to the card fan manner when the finger gesture is determined to be a finger tap gesture.

12. The method of claim 1, wherein the windows include one center window located at the center of the touch screen whose edges are parallel to corresponding edges of the touch screen.

13. The method of claim 1, wherein the further comprising:
displaying a scroll bar adjacent to the one or more windows currently displayed on the touch screen; and
rendering a movable icon at a predefined location on the scroll bar in accordance with the display order of the one or more windows currently displayed on the touch screen.

14. The method of claim 1, wherein the maximum number of windows to be displayed simultaneously on the touch screen is dependent on a display mode associated with an orientation of the electronic device.

15. An electronic device, comprising:
a touch screen;
one or more processors;
memory; and
one or more programs, wherein the one or more programs are stored in the memory and configured to be executed by the one or more processors, the one or more programs including instructions for:
determining a total number of multiple windows rendered on the electronic device and a display order associated with the windows, each window corresponding to a respective application running on the electronic device;
determining a respective display location for each of the windows based at least in part on the display order and the total number of the windows;
choosing a smaller number from (i) the total number of the windows and (ii) a pre-configured maximum number of windows to be displayed simultaneously on the touch screen as a current number of windows to be displayed simultaneously on the touch screen;
determining a first display size for the windows based on the current number of windows to be displayed simultaneously on the touch screen and a size of the touch screen;
displaying one or more of the windows on the touch screen according to their respective determined display locations and the first display size in a card fan manner;
in response to (i) a removal of one of the windows from the touch screen and (ii) a determination that the current number of windows to be displayed simultaneously on the touch screen is no greater than the pre-configured maximum number of windows to be displayed simultaneously on the touch screen:
increasing the first display size to a second display size;
updating the respective display location and a corresponding orientation for each of the windows based on the current number of the windows after the removal of one of the windows; and
adjusting the display of each of the windows on the touch screen according to the second display size, the updated respective display location, and the updated corresponding orientation; and
in response to (i) a rendition of a new window on the electronic device and (ii) a determination that the current number of windows to be displayed simultaneously on the touch screen is less than the pre-configured maximum number of windows to be displayed simultaneously on the touch screen:
decreasing the first display size to a third display size;
updating the respective display location and the corresponding orientation for each of the windows based on the current number of the windows including the new window; and
adjusting the display of each of the windows on the touch screen according to the third display size, the updated respective display location, and the updated corresponding orientation.

16. The device of claim 15, wherein the windows correspond to instances of different applications running on the electronic device.

17. The device of claim 15, wherein the windows correspond to instances of one application running on the electronic device.

18. The device of claim 15, wherein the one or more programs further include instructions for:
detecting a user instruction to add a new window to the windows;
in response to the user instruction:
updating the total number of the windows;
updating the respective display locations of the windows on the touch screen when the updated total number of the windows is within a predefined range;
updating the respective display size for each of the windows on the touch screen when the updated total number of the windows is less than the maximum number of windows to be displayed simultaneously on the touch screen; and
dynamically rendering the new window and the windows on the touch screen according to their respective updated display locations and their respective updated display size in the card fan manner.

19. The device of claim 15, wherein the one or more programs further include instructions for:

detecting a finger swipe gesture on one of the windows on the touch screen;
in response to the finger swipe gesture:
removing the finger-swiped window from the touch screen;
updating the total number of the remaining windows;
updating the respective display locations of the remaining windows on the touch screen when the updated total number of the remaining windows is within a predefined range;
updating the respective display size for each of the remaining windows on the touch screen when the updated total number of the remaining windows is less than the maximum number of windows to be displayed simultaneously on the touch screen; and
dynamically rendering the remaining windows on the touch screen according to their respective updated display locations and their respective updated display size in the card fan manner.

20. The device of claim 15, wherein the one or more programs further include instructions for:
detecting a leftward finger swipe gesture on the touch screen;
in response to the leftward finger swipe gesture, rotating the windows counterclockwise in the card fan manner by a first degree defined by the leftward finger swipe gesture while maintaining their positions relative to each other;
detecting a rightward finger swipe gesture on the touch screen; and
in response to the rightward finger swipe gesture, rotating the windows clockwise in the card fan manner by a second degree defined by the rightward finger swipe gesture while maintaining their locations relative to each other.

21. The device of claim 15, wherein the one or more programs further include instructions for:
detecting a circular finger movement on the touch screen;
in response to the circular finger movement, rotating the windows in the card fan manner in a direction consistent with the circular finger movement while maintaining their positions relative to each other;
detecting a termination of the circular finger movement on the touch screen; and
in response to the termination of the circular finger movement, stopping rotating the windows on the touch screen.

22. The device of claim 15, wherein the one or more programs further include instructions for:
detecting a finger tap gesture on one of the windows on the touch screen;
replacing the windows with an enlarged version of the finger-tapped window on the touch screen when a duration of the finger tap gesture is less than a predefined time interval; and
dynamically changing the display of the windows from the card fan manner to a card stack manner when the duration of the finger tap gesture is equal to or greater than the predefined time interval.

23. A non-transitory computer readable storage medium storing one or more programs, the one or more programs comprising instructions, which when executed by an electronic device with a touch screen, cause the device to:
determine a total number of multiple windows rendered on the electronic device and a display order associated with the windows, each window corresponding to a respective application running on the electronic device;
determine a respective display location for each of the windows based at least in part on the display order and the total number of the windows;
choose a smaller number from (i) the total number of the windows and (ii) a pre-configured maximum number of windows to be displayed simultaneously on the touch screen as a current number of windows to be displayed simultaneously on the touch screen;
determine a first display size for the windows based on the current number of windows to be displayed simultaneously on the touch screen and a size of the touch screen;
display one or more of the windows on the touch screen according to their respective determined display locations and the first display size in a card fan manner;
in response to (i) a removal of one of the windows from the touch screen and (ii) a determination that the current number of windows to be displayed simultaneously on the touch screen is no greater than the pre-configured maximum number of windows to be displayed simultaneously on the touch screen:
increasing the first display size to a second display size;
updating the respective display location and a corresponding orientation for each of the windows based on the current number of the windows after the removal of one of the windows; and
adjusting the display of each of the windows on the touch screen according to the second display size, the updated respective display location, and the updated corresponding orientation; and
in response to (i) a rendition of a new window on the electronic device and (ii) a determination that the current number of windows to be displayed simultaneously on the touch screen is less than the pre-configured maximum number of windows to be displayed simultaneously on the touch screen:
decreasing the first display size to a third display size;
updating the respective display location and the corresponding orientation for each of the windows based on the current number of the windows including the new window; and
adjusting the display of each of the windows on the touch screen according to the third display size, the updated respective display location, and the updated corresponding orientation.

* * * * *